US008801116B1

(12) United States Patent
Pack et al.

(10) Patent No.: US 8,801,116 B1
(45) Date of Patent: Aug. 12, 2014

(54) OUTSIDE-MOUNTED FRAME FOR REFRIGERATION SYSTEMS

(71) Applicant: Anthony Inc., Sylmar, CA (US)

(72) Inventors: William Pack, Palos Verdes Estates, CA (US); Ryan Wach, Glendale, CA (US); Matthew Rolek, Valencia, CA (US); Mark Sandnes, Granada Hills, CA (US); Paul Artwohl, Stevensville, MI (US); John Roche, Bishop, GA (US)

(73) Assignee: Anthony Inc., Sylmar, CA (US)

( * ) Notice: Subject to any disclaimer, the term of this patent is extended or adjusted under 35 U.S.C. 154(b) by 0 days.

(21) Appl. No.: 13/794,037

(22) Filed: Mar. 11, 2013

Related U.S. Application Data

(60) Provisional application No. 61/754,908, filed on Jan. 21, 2013.

(51) Int. Cl.
*A47B 3/04* (2006.01)
*F25D 23/02* (2006.01)
*B23P 6/00* (2006.01)

(52) U.S. Cl.
CPC .............. *F25D 23/028* (2013.01); *B23P 6/00* (2013.01)
USPC .......................................... 312/116; 312/405

(58) Field of Classification Search
USPC ........... 312/116, 138.1, 139.2, 405, 304, 349; 49/401, 402, 381, 61, 62, 63, 67
See application file for complete search history.

(56) References Cited

U.S. PATENT DOCUMENTS

| | | | | |
|---|---|---|---|---|
| 2,046,909 A * | 7/1936 | Terry et al. | ................ | 312/300 |
| 3,299,574 A | 1/1967 | Alexeff et al. | | |
| 3,331,159 A * | 7/1967 | Cooke et al. | ................ | 49/371 |
| 3,631,630 A * | 1/1972 | Buffington et al. | ............ | 49/402 |
| 4,004,370 A * | 1/1977 | Heaney | ................ | 49/70 |
| 4,048,774 A * | 9/1977 | Yamamoto | ................ | 52/202 |
| 4,248,489 A | 2/1981 | Barroero et al. | | |
| 5,428,968 A * | 7/1995 | Tetsukawa et al. | ............ | 62/248 |
| 6,056,383 A * | 5/2000 | Banicevic et al. | ............ | 312/406 |
| 6,401,399 B1 | 6/2002 | Roche et al. | | |
| 2011/0304253 A1 * | 12/2011 | Howington et al. | .......... | 312/405 |

* cited by examiner

*Primary Examiner* — Matthew Ing
(74) *Attorney, Agent, or Firm* — Knobbe, Martens, Olson & Bear LLP

(57) ABSTRACT

A frame assembly can be configured to couple one or more doors to a refrigeration case having an opening. The frame assembly can be mounted outside the opening of the refrigeration case, which can reduce the amount of energy needed for heating the frame assembly and doors to prevent condensation. Mounting the frame assembly outside the opening can also improve the uniformity of light used to illuminate goods displayed in the refrigeration case. Mounting the frame assembly outside the opening can also allow for the use of larger doors. In some embodiments, and adapter can be used to mount the frame assembly outside the opening. In some embodiments, refrigeration units having a frame assembly mounted in the opening can be retrofitted to include a frame assembly that is mounted outside the opening.

28 Claims, 14 Drawing Sheets

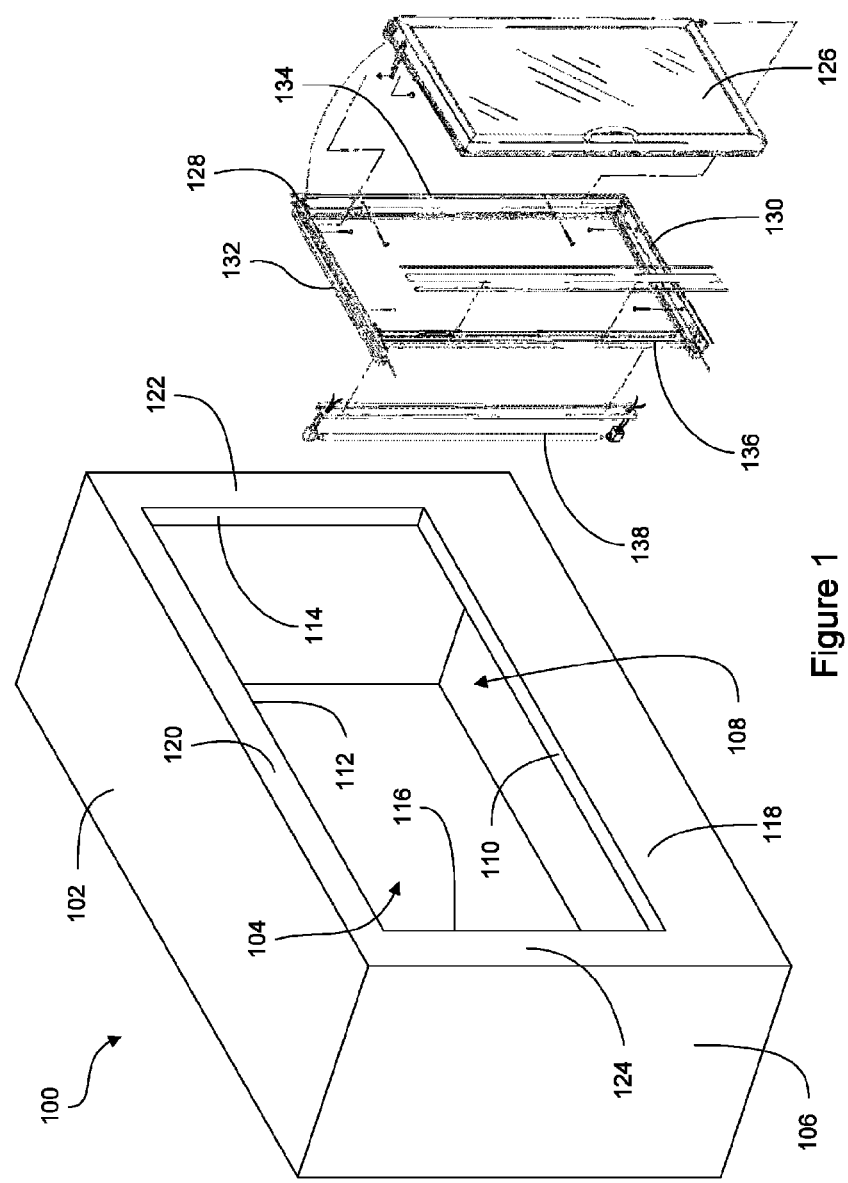

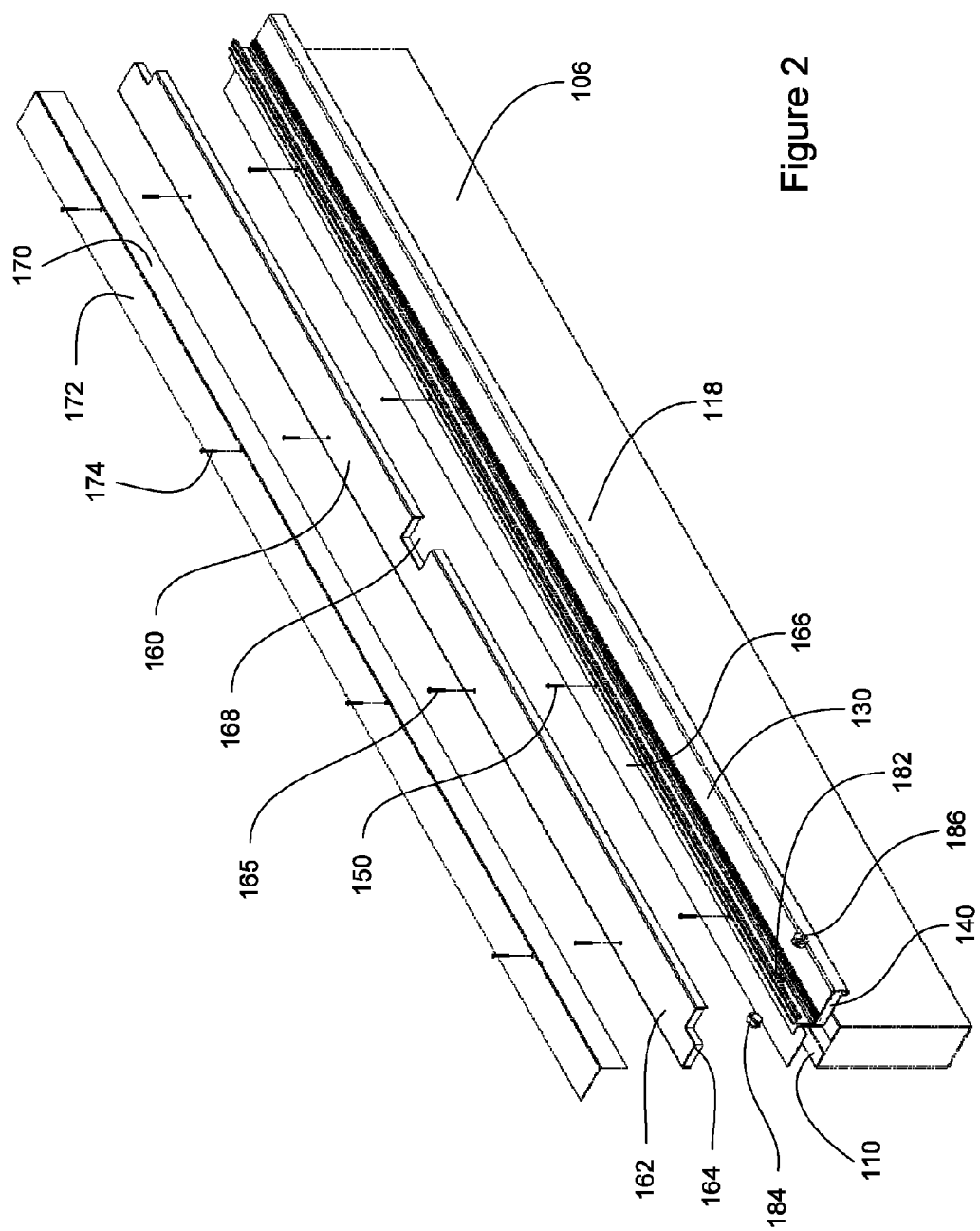

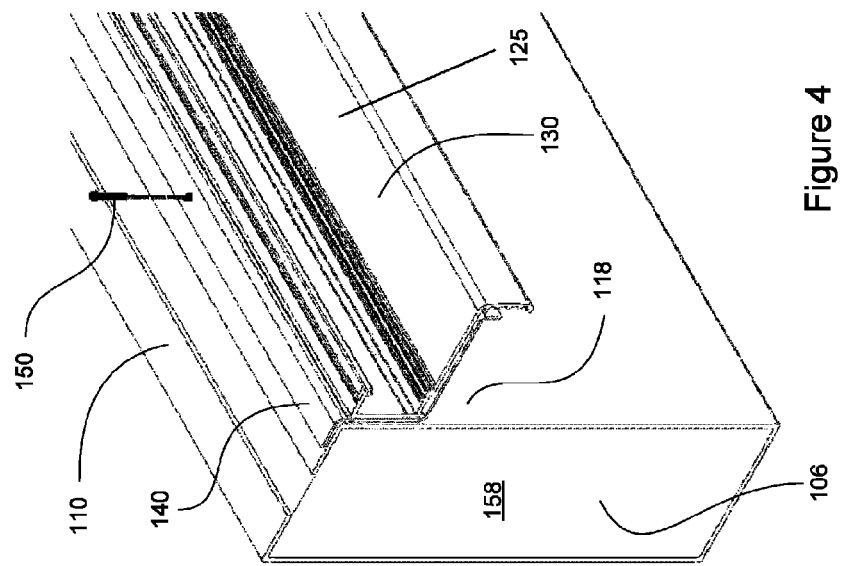
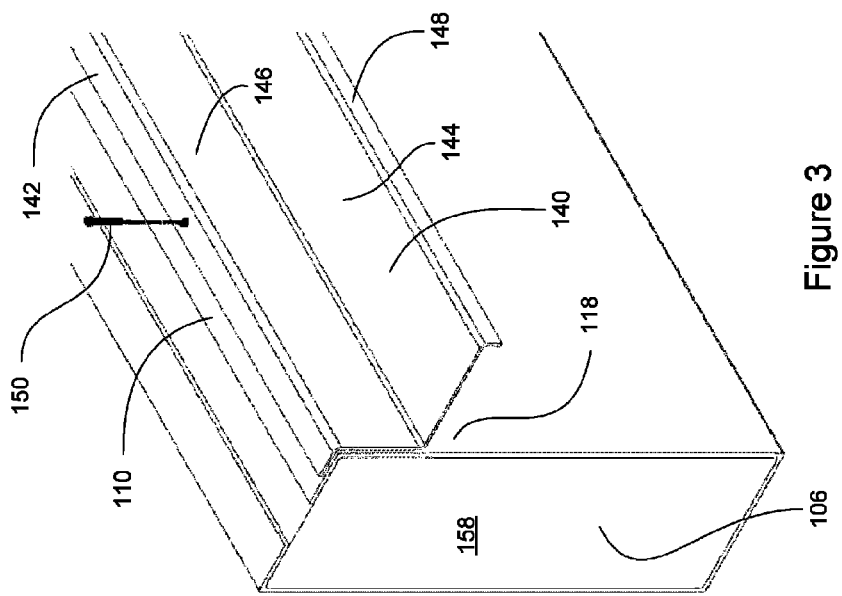

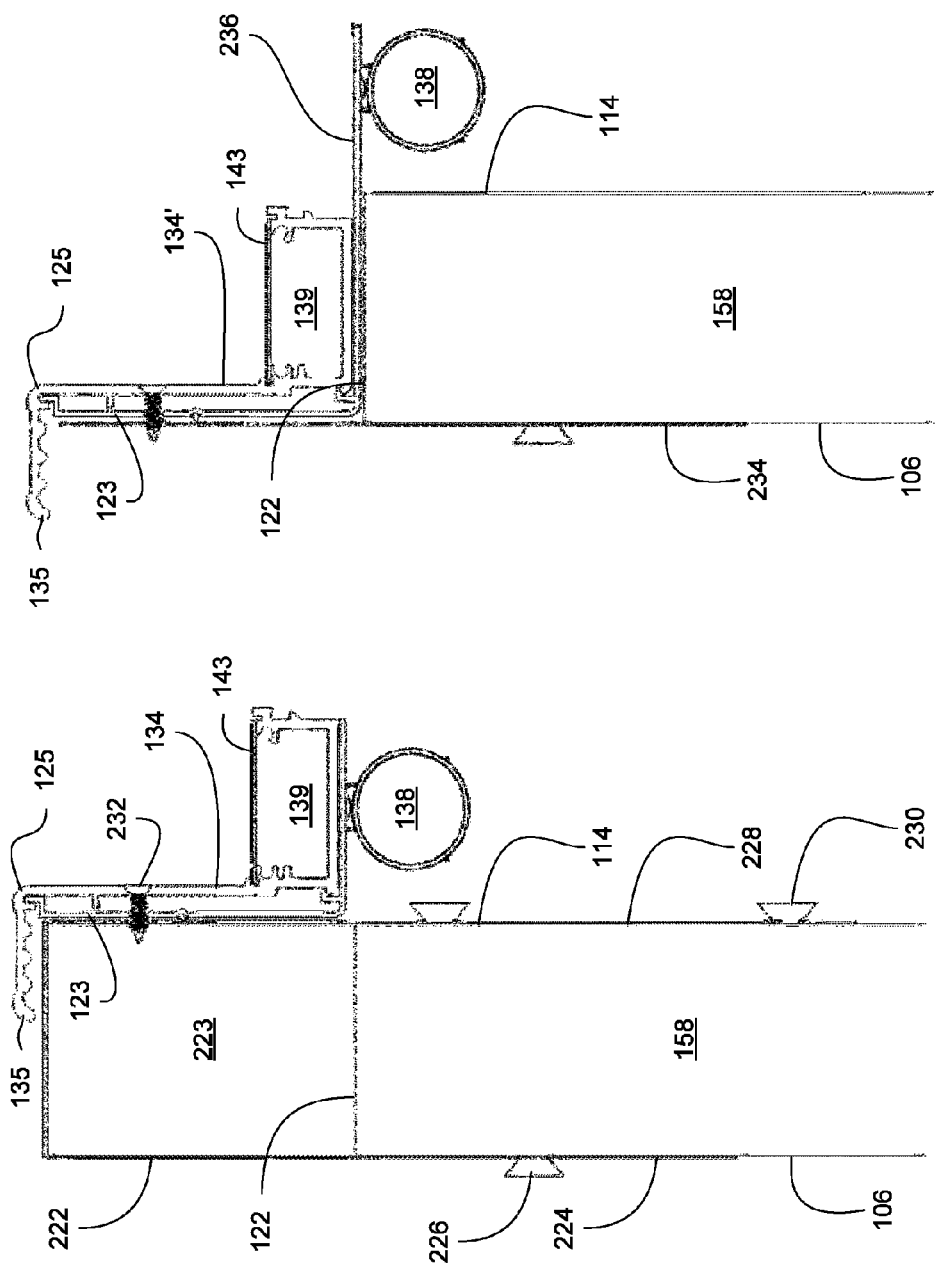

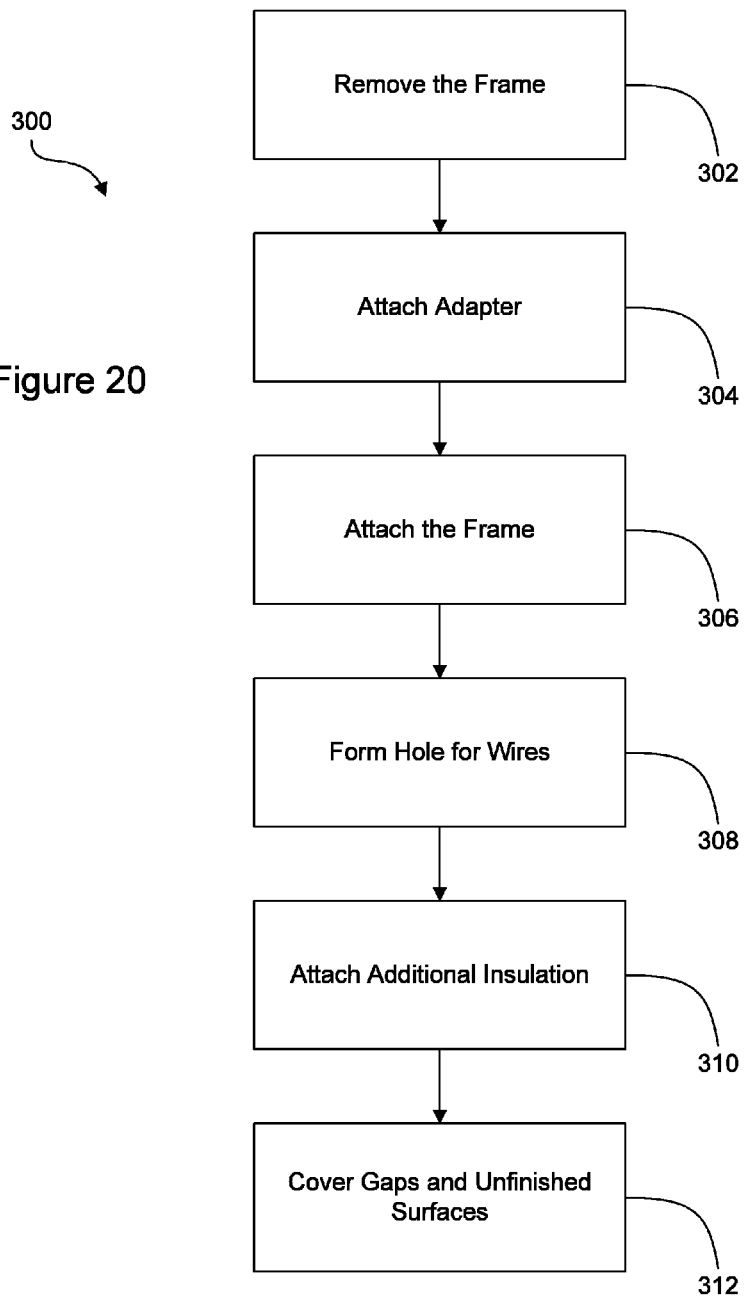

OUTSIDE-MOUNTED FRAME FOR REFRIGERATION SYSTEMS

CROSS-REFERENCE TO RELATED APPLICATIONS

This application claims the benefit under 35 U.S.C. §119 (e) of U.S. Provisional Patent Application No. 61/754,908, filed on Jan. 21, 2013, and titled OUTSIDE-MOUNTED FRAME FOR REFRIGERATION SYSTEMS, the entirety of which is hereby incorporated by reference and made a part of this specification for all that it discloses.

BACKGROUND

1. Field of the Disclosure

This disclosure relates generally to refrigeration systems, and more specifically to frames for mounting doors to refrigeration units.

2. Description of the Related Art

Refrigeration units, such as commercial refrigeration display cases commonly used in grocery stores, can include one or more doors mounted onto the refrigeration units. The doors typically include large glass windows or panels to allow a shopper to view the goods displayed inside the refrigeration units without opening the doors. To prevent condensation from forming on the glass (which can obscure the view of the goods) or on other components (e.g., a frame of the one or more doors), heaters can be used to prevent or reduce the formation of condensation. However, the heaters consume energy and can increase the cost of operating the refrigeration units.

Accordingly, there is a need for more energy efficient refrigeration display case assemblies.

SUMMARY

Various embodiments relate to a refrigeration unit that includes a refrigeration case having an interior chamber, at least one side wall, and an opening to provide access to the interior chamber. The opening can have a bottom surface at a bottom of the opening, and the refrigeration case can have a bottom exterior surface adjacent to the bottom of the opening. The refrigeration unit can include a frame assembly coupled to the refrigeration case. The refrigeration unit can include at least one door coupled to the frame assembly, and the at least one door can be movable between an open position and a closed position. The at least one door can be configured to seal against the frame assembly when in the closed position. At least a portion of the frame assembly can be disposed outside the opening.

In some embodiments, the frame assembly can include a lower frame portion. In some embodiments, at least a portion of the frame assembly (e.g., at least a portion of the lower frame portion) can be disposed outside the opening such that the at least one door is disposed forward of a plane defined by the bottom exterior surface of the refrigeration case.

The refrigeration unit can include at least one adapter that couples the frame assembly to the refrigeration case. In some embodiments, the at least one adapter includes an attachment member removably coupled to the bottom surface of the opening and a generally horizontal support surface disposed outside the opening. The frame assembly can be positioned over the support surface such that the support surface provides support to the frame assembly. The at least one adapter can include an extension portion extending generally downward from the attachment member to the support surface such that the support surface is spaced apart from the attachment member and disposed lower than the bottom surface of the opening.

In some embodiments, a majority of the lower frame portion is disposed forward of the plane defined by the bottom exterior surface of the refrigeration case. In some embodiments, at least about 75% of the lower frame portion is disposed forward of the plane defined by the bottom exterior surface of the refrigeration case. In some embodiments, substantially the entire lower frame portion is disposed forward of the plane defined by the bottom exterior surface of the refrigeration case. In some embodiments, a majority of the lower frame portion is disposed lower than bottom surface of the opening. In some embodiments, at least about 75% of the lower frame portion is disposed lower than bottom surface of the opening. In some embodiments, substantially the entire lower frame portion is disposed lower than bottom surface of the opening.

The refrigeration unit can include a frame sealing gasket, and a lower portion of the frame sealing gasket is attached to the lower frame portion. The frame sealing gasket can be configured to seal against the at least one door. In some embodiments, at least a portion of the lower portion of the frame sealing gasket can be disposed forward of the plane defined by the bottom exterior surface of the refrigeration case. In some embodiments, at least a majority of the lower portion of the frame sealing gasket can be disposed forward of the plane defined by the bottom exterior surface of the refrigeration case. In some embodiments, substantially all of the lower portion of the frame sealing gasket can be disposed forward of the plane defined by the bottom exterior surface of the refrigeration case. In some embodiments, at least a portion of the lower portion of a frame sealing gasket is disposed lower than the bottom surface of the opening. In some embodiments, at least a majority of the lower portion of a frame sealing gasket is disposed lower than the bottom surface of the opening. In some embodiments, substantially the entire lower portion of a frame sealing gasket is disposed lower than the bottom surface of the opening.

In some embodiments, a vertical height of the at least one door can be greater than a vertical height of the opening. A vertical height of the frame assembly can be greater than a vertical height of the opening. A horizontal width of the frame assembly can be greater than a horizontal width of the opening. The frame assembly can include an upper frame portion, a right frame portion, and a left frame portion, and the frame portions can be coupled to form a closed polygonal (e.g., rectangular) shape.

The lower frame portion can include a back side that faces generally rearward, and a majority of the back side of the lower frame portion can face towards the bottom exterior surface. The one or more side walls of the refrigeration case can include an insulating wall that comprises insulation, and the insulating wall can be disposed directly rearward of a majority of the lower frame portion such that the insulation of the insulating wall insulates the lower frame portion from the interior camber of the refrigeration case. In some embodiments, a majority of the lower frame portion does not have an insulating wall disposed directly therebelow. In some embodiments, the refrigeration unit can include an insulating member disposed over at least a portion of the lower frame portion. In some embodiments, less than about 20%, or less than 10%, or less than 5%, of the lower frame portion is exposed to the interior chamber of the refrigeration unit. In some embodiments, the at least one side wall can include an extension portion that is disposed over at least a portion of the lower frame portion, and the extension portion can include insulation.

In some embodiment, the refrigeration case can include a support surface configured to support the frame assembly.

Various embodiments relate to an adapter for coupling a door frame to a refrigeration case having an opening with a bottom surface that defines the bottom of the opening. The adapter can include an attachment member configured to be removably coupled to the bottom surface of the opening in the refrigeration case. The adapter can include a generally horizontal support surface configured to support a door frame positioned over the support surface. The adapter can include an extension portion extending generally downward from the attachment member to the support surface such that the support surface is spaced apart from the attachment member and disposed lower than the bottom surface of the opening when the adapter is coupled to the refrigeration case.

In some embodiments, the adapter can be generally Z-shaped. The attachment member can be substantially planar. The support surface can be substantially planar. The extension portion can be substantially planar.

A door frame assembly can include the adapter and a door frame configured to attach to the support surface of the adapter. The door frame can be configured to attach to one or more doors.

A refrigeration unit can include the adapter and a refrigeration case that has an opening with a bottom surface that defines the bottom of the opening. The attachment member of the adapter can be removably coupled to the bottom surface of the opening.

Various embodiments relate to a refrigeration unit that can include a refrigeration case having an interior chamber, at least one side wall, and an opening to provide access to the interior chamber. The refrigeration unit can include a frame assembly coupled to the refrigeration case, and the frame assembly can be configured to attach to at least one door. At least a portion of the frame assembly can be disposed outside the opening.

In some embodiments, the frame assembly can include a lower frame portion. In some embodiments, a majority of the lower frame portion can be disposed outside the opening. In some embodiments, at least about 75% of the lower frame portion can be disposed outside the opening. In some embodiments, substantially the entire lower frame portion can be disposed outside the opening. In some embodiments, a majority of the frame assembly can be disposed outside the opening. In some embodiments, at least about 75% of the frame assembly can be disposed outside the opening. In some embodiments, substantially the entire frame assembly can be disposed outside the opening.

The refrigeration unit can include a frame sealing gasket configured to seal against the at least one door. In some embodiments, at least a portion of the frame sealing gasket can be disposed outside the opening. In some embodiments, at least a majority of the frame sealing gasket can be disposed outside the opening. In some embodiments, substantially the entire frame sealing gasket can be disposed outside the opening.

The refrigeration unit can include at least one door coupled to the frame assembly. The door can be movable between an open position and a closed position, and the door can be configured to seal against the frame assembly when in the closed position. In some embodiments, the at least one door can be substantially entirely disposed forward of the opening when the at least one door is in the closed position. In some embodiments, a vertical height of the at least one door can be greater than a vertical height of the opening. In some embodiments, a vertical height of the frame assembly can be greater than a vertical height of the opening. In some embodiments, a horizontal width of the frame assembly can be greater than a horizontal width of the opening.

The at least one side wall can include an extension portion that can be disposed over at least a portion of the lower frame portion. The extension portion can include insulation. In some embodiments, the refrigeration case can include a support surface configured to support the frame assembly.

Various embodiments relate to a method for configuring a refrigeration unit. The method can include accessing a refrigeration case that has an interior chamber, at least one side wall, and an opening that provides access to the interior chamber. The opening can include a bottom surface at a bottom of the opening. The refrigeration case can include a bottom exterior surface adjacent to the bottom of the opening. The method can include coupling a frame assembly to the refrigeration case such that at least a portion of the frame assembly is disposed outside the opening. In some embodiments, at least one door can be coupled to the frame assembly.

In some embodiments, the frame assembly can include a lower portion. At least a portion of the frame assembly (e.g., at least a portion of the lower frame portion) can be disposed outside the opening such the one or more doors are disposed forward of a plane defined by the bottom exterior surface of the refrigeration case.

In some embodiments, coupling the frame assembly to the refrigeration case can include attaching an adapter to the bottom surface of the opening. The adapter can include a support surface disposed outside the opening. Coupling the frame assembly to the refrigeration case can include attaching the frame assembly to the support surface of the adapter. In some embodiments, the adapter can be generally Z-shaped.

In some embodiments, the method can include removing a prior frame assembly from the refrigeration case before coupling the frame assembly to the refrigeration case. In some embodiment, at least a portion of the prior frame assembly was positioned inside the opening prior to removal. In some embodiments, the prior frame assembly was attached to the bottom surface of the opening. In some embodiments, the prior frame assembly was attached to the bottom surface of the opening by securing mechanisms (e.g., screws or bolts) that engage a plurality of securing locations (e.g., holes) on the bottom surface of the opening, and the adapter can be attached to the bottom surface of the opening by securing mechanisms (e.g., screws or bolts) that engage the same plurality of securing locations (e.g., holes) used to attach the prior frame assembly.

In some embodiments, the method can include positioning an insulating member over at least a portion of the lower frame portion.

Various embodiments can relate to a refrigeration unit that includes a refrigeration case that has an interior chamber, at least one side wall, and an opening to provide access to the interior chamber. A frame assembly can be coupled to the refrigeration case. The frame assembly can include a lower frame portion. At least one door can be coupled to the frame assembly. The at least one door can be movable between an open position and a closed position. The at least one door can be configured to seal against the frame assembly when in the closed position. In some embodiments, less than about 20% of the lower frame portion is exposed to the interior chamber of the refrigeration unit. In some embodiments, less than about 10% of the lower frame portion is exposed to the interior chamber of the refrigeration unit. In some embodiments, less than about 50% of the lower frame portion is exposed to the interior chamber of the refrigeration unit.

The refrigeration unit can include an insulating member disposed over at least a portion of the lower frame portion. The one or more side walls can include an insulating wall that includes insulation. The insulating wall can be disposed directly rearward of a majority of the lower frame portion such that the insulation of the insulating wall insulates the lower frame portion from the interior camber of the refrigeration case. In some embodiments, a majority of a bottom side of the lower frame portion is exposed to ambient air from outside the refrigeration unit.

The refrigeration unit can include a sealing gasket coupled to the frame assembly, and the sealing gasket insulates a portion of the frame assembly from the interior chamber of the refrigeration case.

Various embodiments can relate to a refrigeration unit that includes a refrigeration case that has an interior chamber, at least one side wall, and an opening to provide access to the interior chamber. The opening can include a bottom surface at a bottom of the opening. The refrigeration case can include a bottom exterior surface adjacent to the bottom of the opening. The refrigeration unit can include at least one door. The refrigeration unit can include means for coupling the at least one door to the refrigeration case such that the at least one door is movable between an open position and a closed position. The at least one door can be disposed forward of a plane defined by the bottom exterior surface of the refrigeration case.

The coupling means can include a frame assembly. A vertical height of the at least one door can be greater than a vertical height of the opening. The refrigeration can include a sealing gasket coupled to the coupling means and configured to seal against the at least one door. The sealing gasket can be disposed forward of the plane defined by the bottom exterior surface of the refrigeration case.

BRIEF DESCRIPTION OF THE DRAWINGS

FIG. 1 shows a perspective view of one embodiment of a refrigeration unit with a frame and door system in a partial exploded view.

FIG. 2 is a perspective and partially exploded view of one embodiment of a lower frame portion coupled to a lower portion of a wall of a refrigeration case using an adapter.

FIG. 3 is a perspective view of one embodiment of an adapter secured to the refrigeration case.

FIG. 4 is a perspective view of one embodiment of a lower frame portion coupled to the adapter of FIG. 3.

FIG. 18 is a partial cross-sectional view of an embodiment of a right frame portion coupled to the refrigeration case.

FIG. 19 is a partial cross-sectional view of another embodiment of a right frame portion coupled to the refrigeration case.

FIG. 20 is an embodiment of a method for retrofitting a refrigeration unit to include an outside-mounted frame.

DETAILED DESCRIPTION OF CERTAIN EMBODIMENTS

Figure 5:
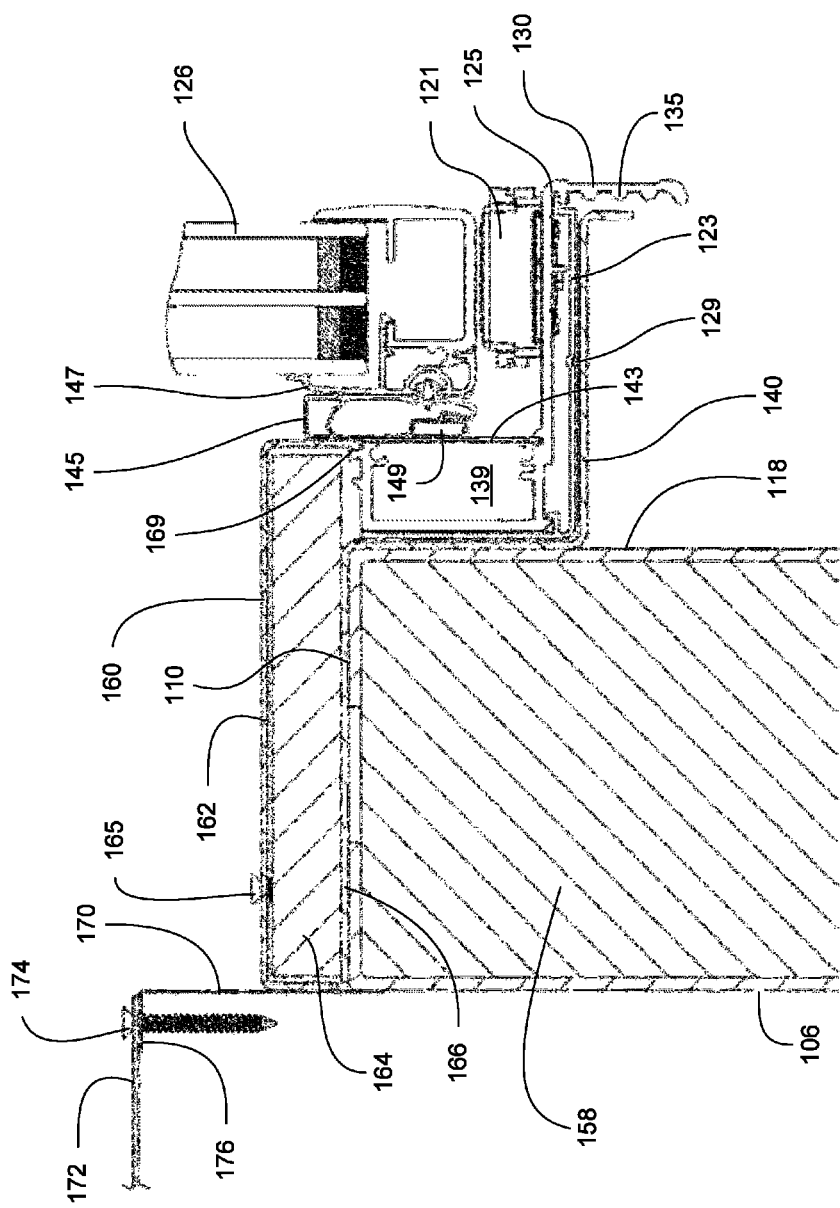
FIG. 5 is a partial cross-sectional view showing an embodiment of the lower frame assembly coupled to the refrigeration case.

Various embodiments disclosed herein relate to a refrigeration unit that includes an outside-mounted frame that is mounted outside of an opening formed in a refrigeration case. The frame can be mounted alongside one or more external (e.g., forward-facing) surfaces adjacent to the opening, as opposed to being mounted inside the opening (e.g., alongside the inwardly-facing surfaces of the opening). Positioning the frame and/or door outside of the opening can advantageously provide significant energy savings. By positioning the frame and/or door further forward than traditional frame and door locations, the frame and/or door can be positioned further away from the cold environment of the refrigeration unit that houses the goods. In some refrigeration units, a sheet of cold air flows across the opening of the refrigeration unit (e.g., from top to bottom). Positioning the frame and/or door outside of the opening can reduce the cooling effect of the sheet of cold air on the door and/or frame. Thus, by positioning the frame and/or door outside of the opening, less power (e.g., to operate heaters) is advantageously needed to reduce or prevent condensation from forming on the frame and/or door. Also, by placing the frame outside the opening, condensation can advantageously be cleared faster, as opposed to a frame mounted inside the opening. Also, by placing the frame over an outside surface of an insulated refrigeration case, the insulation of the refrigeration case itself advantageously insulate the frame from the cold area inside the refrigeration unit, thereby reducing the power needed to prevent or reduce condensation from forming on the frame and/or door. In some instances, by mounting the frame and door outside the opening of the refrigeration unit, the heater power can advantageously be reduced from about 100 watts to about 20 to 30 watts (e.g., can be reduced by about 20% or more, or about 30% or more, or about 50% or more, or about 70% or more). Additionally, having the frame mounted outside the opening can advantageously improve the illumination of the goods displayed in the refrigeration unit.

By positioning the frame further forward than traditional frame locations, a light source mounted to the frame can also be positioned further forward (e.g., by about 2 to 3 inches), thereby increasing the distance between the light source and the goods being displayed (e.g., by about 2 to 3 inches), which can improve the uniformity of the distribution of light across the goods being displayed. Also, mounting the frame outside the opening can advantageously allow for a larger door to be used to close the opening. By increasing the size of the glass window on the door, a more modern and pleasing aesthetic appearance can be achieved, and in some cases a larger viewing area can be provided.

FIG. 1 shows one embodiment of a refrigeration unit 100 that includes a refrigeration case 102. The refrigeration case 102 can include an interior chamber 104, which can be refrigerated and can include shelves (not shown) for displaying goods. The refrigeration case 102 can include side walls 106 that at least partially enclose the interior chamber 104. The side walls 106 can include insulation to insulate the refrigerated interior chamber 104 from the higher temperature of the ambient air. An opening 108 can provide access to the interior chamber 104. The opening 108 can include a bottom surface 110, a top surface 112, a right side surface 114, and a left side surface 116, which can face inwardly towards the opening 108. The refrigeration case 102 can include a bottom exterior surface 118 on the outside of the opening 108 adjacent to the bottom surface 110, a top exterior surface 120 on the outside of the opening 108 adjacent to the top surface 112, a right exterior surface 122 on the outside of the opening 108 adjacent to the right side surface 114, and a left exterior surface 124 on the outside of the opening 108 adjacent to the left side surface 116.

The refrigeration unit 100 can include one or more doors 126 that can be selectively move to open and close the opening 108 (e.g., to allow and disallow access to the interior chamber 104). The doors 126 can be mounted onto a frame assembly 128, which can be mounted onto the refrigeration case 102. A partial exploded view of a frame assembly 128 and door 126 is shown in FIG. 1. The frame assembly 128 can include a bottom portion 130 (sometimes referred to as a sill), a top portion 132 (sometimes referred to as a header), and side portions 134 (sometimes referred to as right and left ends, only one of which is shown in FIG. 1). Depending on the size of the opening 108 and the frame assembly 128, one or more mullions 136 (only one of which is shown in FIG. 1) can be used. For ease of viewing, only a single door 126 and associated frame assembly 128 is shown in FIG. 1. In some embodiments, the refrigeration unit 100 can include multiple doors. In some embodiments, the bottom portion 130, top portion 132, and side portions 134 of the frame assembly 128 can be coupled together to form a substantially closed perimeter (e.g., a closed rectangular shape), which can surround the one or more doors 126. The complete frame structure can provide structural strength to support the frame assembly 128 and doors 126.

In some embodiments, the refrigeration unit can include doors that are mounted to a refrigeration case without the use of a frame assembly 128. For example, brackets can be provided on one or more of the outside surfaces 118, 120, 122, and 124, and a door can be hingedly mounted to the brackets such that the door can close and seal against one or more of the outside surfaces 118, 120, 122, and 124. Using a frame assembly 128 to couple the doors 126 to the refrigeration case 102 can be beneficial, as compared to mounting doors to the a refrigeration case without a frame assembly 128 (e.g., by using brackets as mentioned above). For example, the frame assembly 128 and doors 126 can be designed and installed as an integrated system having features that are specifically designed (e.g., pre-positioned) to function together. The frame assembly 128 can include sealing surfaces (e.g., including a sealing gasket) that are specifically designed and positioned to mate with sealing surfaces (e.g., including a sealing gasket) of the door 126. The frame assembly 128 can include hinges and/or other mechanisms that can facilitate opening and closing of the door 126. The hinges and/or other mechanisms can be positioned on the frame assembly 128 at locations that enable proper operation of the door 126. For doors that are mounted to a refrigeration case without a frame assembly 128 (e.g., using brackets), the installation generally involves installation of several separate components that can require calibration, can be prone to installation errors, and can be time consuming. For example, if no frame assembly 128 is used, imperfections in the refrigeration case or in the installation process of the mounting brackets may result in a door that does not sealing properly against the refrigeration case.

The frame assembly 128 can also include electrical components (e.g., electrical wiring, lights) that are incorporated into the frame assembly 128 to ease installation and/or to facilitate proper positioning of the electrical components. For example, the frame assembly 128 can include one or more light sources 138. In one embodiment, the light sources 138 can be positioned in a generally vertical orientation, and can be positioned behind the mullions 136 and/or behind the side portions 134 of the frame assembly 128. The light sources 138 can illuminate the goods displayed by the refrigeration unit 100. The light sources 138 can provide a desired distribution of light across the goods (e.g., to provide generally uniform illumination). Incorporating the light sources 138 into the frame assembly 128 can facilitate the proper positioning of the light sources 138 during installation. The light sources 138 can be prewired into the frame, which can facilitate the installation process and prevent wires from cluttering the refrigeration unit 100. Additionally, one or more heaters can be included in the frame assembly 128, e.g., for heating the frame portions 130, 132, 134 and/or the doors 126 (e.g., the glass panels of the doors 126). The one or more heaters can be prewired into the frame, which can facilitate the installation process and can prevent wires from cluttering the refrigeration unit 100.

In some refrigeration units 100, the frame assembly 128 can be mounted inside the opening 108. For example, the downward facing surface of the bottom portion 130 of the frame assembly 128 can be positioned over the bottom surface 110 of the opening 108. The bottom portion 130 of the frame assembly 128 can rest on the bottom surface 110 of the opening 108 such that the weight of the frame assembly 128 and doors 126 is borne by the wall portion below the opening 108.

In various embodiments disclosed herein, the frame assembly 128 can be coupled to the refrigeration case 102 such that the frame assembly 128 is disposed outside (e.g., spaced apart from) the opening 108. For example, the bottom portion 130 of the frame assembly 128 can be positioned forward of the bottom exterior surface 118, as opposed to being positioned over the surface 110. In some embodiments, the top portion 132 of the frame assembly 128 can be positioned forward of the top external surface 120. In some embodiments, the side portions 134 of the frame assembly 128 can be positioned forward of the corresponding right and left exterior surfaces 122 and 124. Positioning the frame assembly 128 and/or the door 126 outside the opening 108 can advantageously provide significant energy savings, by using less power to heat the frame assembly 128 and/or door 126 to inhibit (e.g., prevent) condensation from forming due to the refrigerated environment in the interior chamber 104 of the refrigeration case 102. Positioning the frame assembly 128 and/or the door 126 outside the opening 108 can also allow for the use of larger doors 126 (as compared to doors 126 that fit into a frame assembly 128 inside the opening 108), which can provide a more modern and aesthetically pleasing appearance (which can attract customers to the goods displayed in the refrigeration unit 100, for example, in a grocery store). Larger doors can also increase the viewing area. Positioning the frame assembly 128 outside of the opening 108 can also allow for the light sources 138 to be positioned further forward of the displayed goods than if the frame assembly 128 were mounted inside the opening 108. Positioning the light sources 138 further from the displayed goods can improve the distribution of light across the goods displayed in the refrigeration unit 100.

Figure 6:
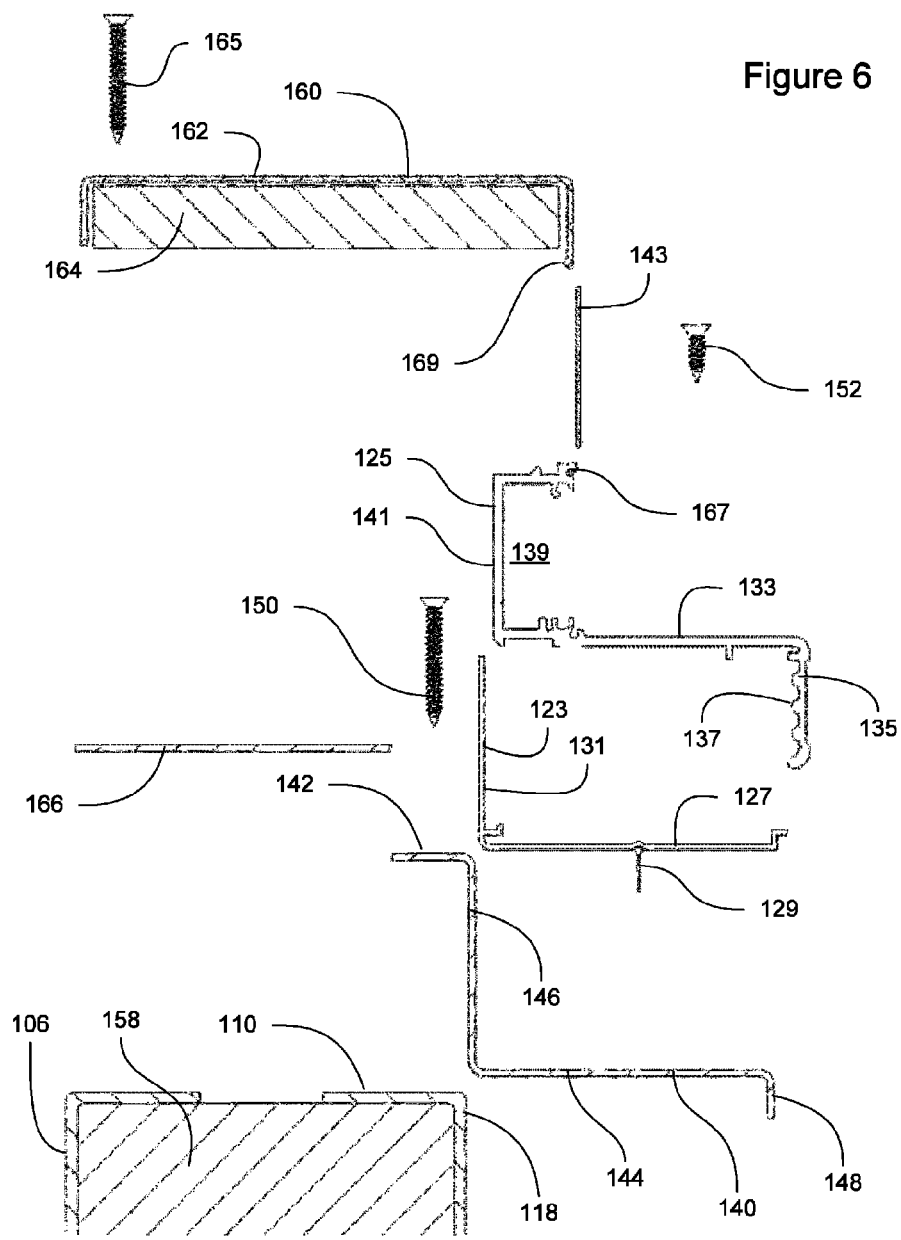
FIG. 6 is an exploded cross-sectional view of an example embodiment of the lower portion of the frame, the case, and the adapter.

FIG. 2 is a partial exploded view of a lower frame portion 130 of a frame assembly 128 that is coupled to a lower wall portion of a refrigeration case 102 by use of an adapter 140. FIG. 3 is a detailed view of the adapter 40 secured to the refrigeration case 102. FIG. 4 is a detailed view of the lower portion 130 of the frame assembly 128 coupled to the adapter 140. FIG. 5 is a partial cross-sectional view showing the lower portion 130 of the frame assembly 128 coupled to the refrigeration case 102 by the adapter 140 and a door 126 in the closed position. FIG. 6 is an exploded cross-sectional view of the lower portion 130 of the frame assembly 128, the case 102, and the adapter 140. In some embodiments, the door 126 can be coupled to the frame assembly 128 by a hinge or other mechanism 121 (e.g., that allows movement, such as pivoting, of the door 126 relative to the frame assembly 128), which can be coupled to the frame assembly 128 (e.g., by adhesive, one or more bolts, screws, clips, pivot mechanisms, or other securing mechanisms).

With reference to FIGS. 5-6, in some embodiments the lower frame portion 130 can include an outer member 123 and an inner member 125. The outer member 123 can be made from an extruded PVC material, although other materials (e.g., other plastics or metals) can be used. The inner member 125 can be made from a metal material (e.g., steel or aluminum), although other materials (e.g., plastics) can be used. The outer member 123 can include a base portion 127, which can be generally horizontal. The base portion 127 of the outer member 123 can rest on a support surface (e.g., of the adapter 140). In some embodiments, a flexible wiper gasket 129 (e.g., weather-stripping) can extend downward from the bottom of the base portion 127, and can be folded or compressed between the adapter 140 and the outer member 123 to form a seal between the adapter 140 and the outer member 123, when the lower frame portion 130 is mounted onto the adapter 140. The outer member 123 can be generally L-shaped, and can include a side portion 131, which can extend generally vertically from the base portion 127. The inner member 125 can include a base portion 133, which can be generally horizontal. The hinges or other mechanisms 121 for coupling the door 126 to the frame assembly 128 can be secured to the base portion 133 of the inner member 125. In some embodiments, the base portion 133 of the inner member 125 is spaced apart from the base portion 127 of the outer member 123 (e.g., to provide space for bolts of other securing mechanisms that secure the hinge or other mechanism 121 to the inner member 125). The inner base portion 125 can be coupled (e.g., secured) to the outer base portion 123 by snap-fit components, or by any other suitable mechanism (e.g., clips, bolts, screws, adhesive, etc.).

In some embodiments, the inner member 125 can include a front flange 135, which can be angled with respect to the base portion 133 (e.g., by between about 60° and about 120°, or by about 90°), so as to provide structural strength to the frame assembly 128. The front flange 135 can provide additional surface area of the frame assembly 128 that is exposed to the relative warm ambient air, thereby helping to heat the frame assembly 128 and reduce the amount of energy used for heating the frame assembly 128 and door 126 mounted to the frame assembly 128. The front flange 135 can include features 137 such as fins or bumps that increase the surface area of the flange 135, which can be, for example, disposed on the back side of the flange 135. The front flange 135 can also provide a finished appearance to the front of the frame assembly 128. In some embodiments, the inner member 125 and/or the outer member 123 can include holes for a screw 152 to couple the lower frame portion 130 to the adapter 140. The lower frame portion 130 can define a cavity or channel 139, which can be used for routing wires through the frame assembly 128. A rear wall 141 can extend generally vertically from the rear of the base portion 133. A cover 143, which can be a metal (e.g., steel) plate, can be used to close the cavity or channel 139. The cover 143 can be removable to provide access to the cavity or channel 139. The cover 143 can be removably secured using snap-fit or clip mechanisms or any other suitable securing mechanism.

A sealing gasket 145 can be attached to the lower frame portion 130 of the frame assembly 128 and can seal against a corresponding sealing gasket 147 that is attached to the door 126. In some embodiments the frame sealing gasket 145 can be attached to the front side of the removable cover 143. For example, the sealing gasket 145 can include a magnet 149, which can couple the gasket 145 to the cover 143. FIG. 5 shows the lower portion of the frame sealing gasket 145 that is attached to the lower frame portion 130. In some embodiments, at least a portion (at least about 25%, at least about 50%, at least about 75%, or about 100%) of the portion of the frame sealing gasket 145 that is attached to the lower frame portion 130 is disposed lower than the bottom surface 110 of the opening 108. In some embodiments, the portion of the frame sealing gasket 145 that is attached to the lower frame portion 130 is disposed forward of the bottom exterior surface 118 of the wall adjacent to the opening 108. The bottom of the door 126 can extend downward beyond the bottom surface 110 of the opening 108. The door 126 can have a vertical height that is larger than the vertical height of the opening 108.

Although not shown, the upper frame portion 132 and/or the side frame portions 134 can be similar to the lower frame portion 130 (e.g., can have a similar structure or arrangement as described herein for the lower frame portion 130). Many variations are possible. In some embodiments, the outer member 123 can be omitted and the member 125 can be mounted directly onto the support surface (e.g., of the adapter 140). For example, FIG. 4 shows the member 125 mounted onto the adapter 140. In some embodiments, the outer member 123 can be used as the adapter for securing the lower frame portion 130 of the frame assembly 128 to the case 102, and the separate adapter piece 140 can be omitted.

In some embodiments, the adapter 140 can be a flange (e.g., a Z-shaped flange), and the adapter 140 can be configured to support the lower frame portion 130 of the frame assembly 128 and/or one or more doors 126. As shown in FIG. 3, the adapter 140 can include an attachment member or surface 142 that can attach the adapter 140 to the refrigeration case 102. For example, the attachment member 142 can secure to the bottom surface 110 of the opening 108 in the refrigeration case 102. The adapter 140 can include a support surface 144, which can be a generally horizontal and can support the lower portion 130 of the frame assembly 128. The adapter 140 can include an extension portion 146, which can extend generally downward (e.g., vertically downward) from the attachment member 142 to the support surface 144. When the adapter 140 is attached to the refrigeration case 102, the support surface 144 can be disposed lower than the bottom surface 110 of the opening 108 and/or forward of the bottom exterior surface 118. In some embodiments, the adapter 140 can position the lower frame portion 130 of the frame assembly 128 (e.g., by the extension portion 146 having a sufficient length) such that when the frame assembly 128 sits on the support surface 144, the lower portion 130 of the frame assembly 128 is disposed lower than the bottom surface 110 of the opening 108, as discussed herein. The adapter 140 can be an integrally formed piece (e.g., a monolithic piece), can have an elongate shape (e.g., that extends along substantially the entire length of the bottom surface 110), and can have a generally consistent cross-sectional shape along substantially the entire length of the adapter 140. In some embodiments, the adapter 140 can be generally Z-shaped. The adapter 140 can be molded or extruded into its final shape, or the adapter 140 can be formed by bending a material (e.g., a metal such as steel or aluminum) to form the shape of the adapter 140. In some embodiments, a single adapter piece 140 (e.g., one that extends along substantially the entire length of the bottom surface 110 of the opening 108) can be used for securing the lower frame portion 130 to the case 102, although multiple, shorter adapter pieces 140 can be used, which may be spaced apart from each other. In some embodiments, one or more adapters similar to the adapter 140 can be used to couple one or more of the top frame portion 132 and the side frame portions 134 to the refrigeration case 102.

In some embodiments, the weight of the frame assembly 128 and doors 126 is borne by the support surface 144 of the adapter 140. Accordingly, the adapter 140 can include additional structural support features that can increase the structural strength of the support surface 144, for example, to inhibit (e.g., prevent) the support surface 144 from bowing under the weight of the frame assembly 128 and doors 126. For example, the adapter 140 can include a flange 148 positioned at the end of the support surface 144 and the flange 148 can be angled with respect to the support surface 144 (e.g., by about 60° to about 120°, or by about 90°). The angled flange 148 can increase the strength of the support surface 144. Other strengthening components can be used, such as ribs or ridges. The flange 148 can also increase the surface area of the adapter 140 that is exposed to relatively warm ambient air, which can increase the amount of heat transferred into the frame assembly 128 by the adapter 140, thereby reducing energy consumption used to heat the frame assembly 128.

Since the frame assembly 128 can, in some embodiments, be mounted onto the bottom surface 110 of the opening 108, the bottom surface 110 can have sufficient strength to bear the weight of the frame assembly 128 and doors 126. In some embodiments, the adapter 140 can be secured to the bottom surface 110 of the opening 108 (e.g., using screws 150 or other suitable securing mechanisms). The lower frame portion 130 can be secured to the adapter using screws 152, although various other securing mechanisms can be used (e.g., an adhesive, foam tape, bolts, clamps, a snap fit engagement, etc.). The lower frame portion 130 can be attached to the support surface 144 of the adapter 140 in a manner that allows heat to readily transfer from the support surface 144 portion of the adapter 140 to the lower frame portion 130. For example, the bottom surface of the lower frame portion 130 can be in contact with the top of the support surface 144. In some embodiments, a thermally conductive adhesive or other thermally conductive material can be used to fill spaces between the lower frame portion 130 and the support surface 144.

Figure 7:
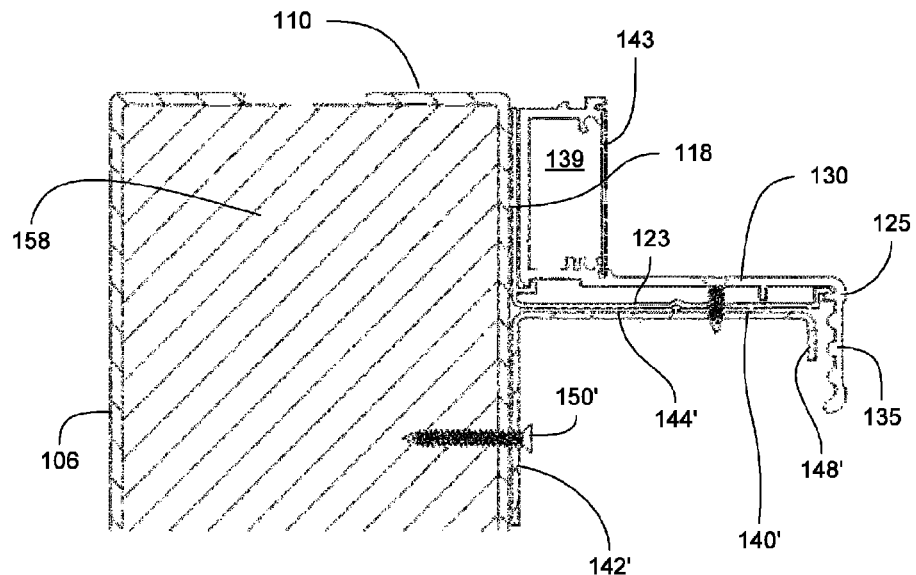
FIG. 7 is a partial cross-sectional view of another embodiment of the lower frame portion mounted to the refrigeration case by another embodiment of an adapter.
Figure 8:
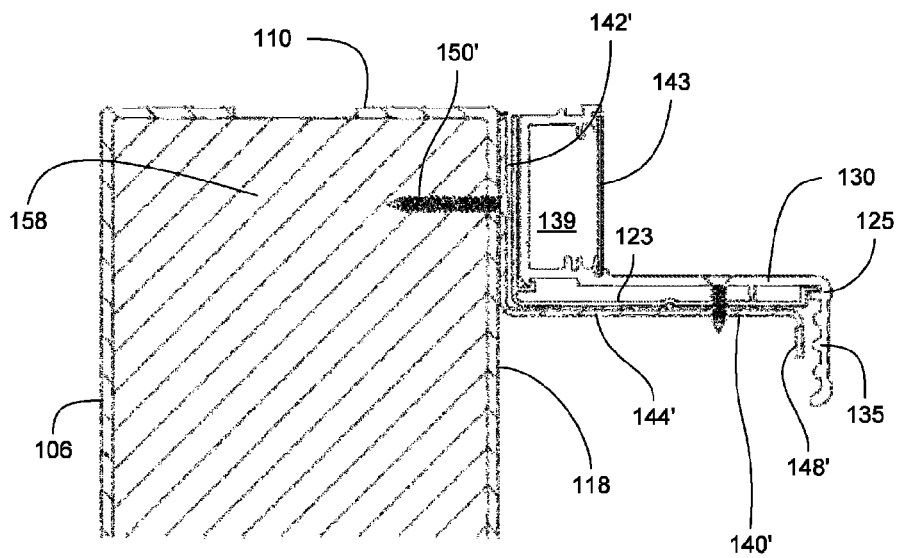
FIG. 8 is a partial cross-sectional view of another embodiment of the lower frame portion mounted to the refrigeration case by another embodiment of an adapter.

Various other adapter configurations are possible. For example, FIG. 7 is a cross-sectional view of another embodiment of an adapter 140' that can be secured to the outside surface 118 of the refrigeration case 102. The adapter 140' includes an attachment member 142 that can be secured to the outside surface 118 of the refrigeration case 102, e.g., using screws 150' or other suitable securing mechanisms. The adapter 140' can include a support surface 144' for supporting the lower frame portion 130. The adapter 140' can include an angled flange 148' to increase the strength of the adapter 140', as discussed herein. In the illustrated embodiment, the adapter 140' has a generally L-shaped cross-sectional shape and does not include an attachment member that attaches to the bottom surface 110 of the opening 108. Various other alternatives are possible. For example, with reference to FIG. 8, the attachment member 142' of the adapter 140' may extend generally upwardly from the support surface 144' (instead of generally downwardly, as illustrated in FIG. 7), and the screws 150' can secure the adapter 140' to the case 102 at locations that are behind the lower frame portion 130. In the embodiment of FIG. 8, the adapter 140' has a generally L-shaped cross-sectional shape and does not include an attachment member that attaches to the bottom surface 110 of the opening 108.

Figure 9:
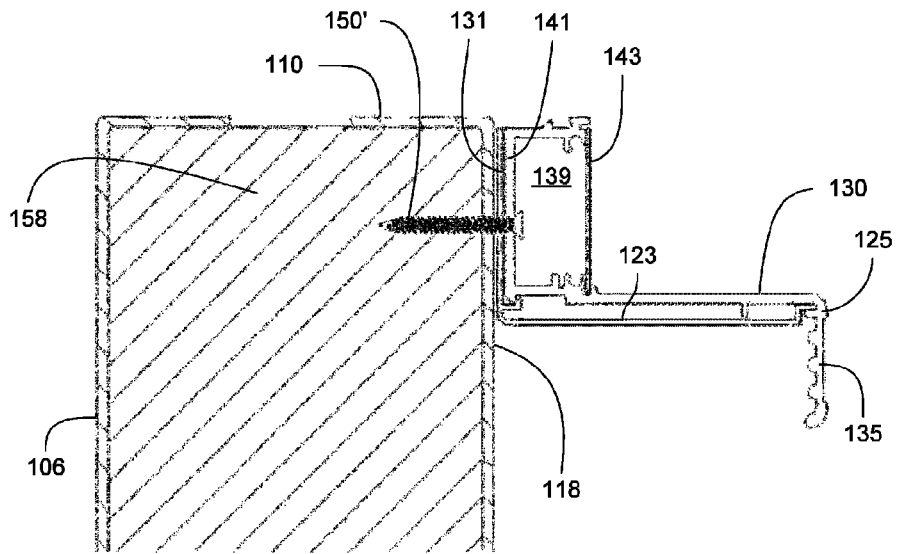
FIG. 9 is a partial cross-sectional view of another embodiment of the lower frame portion mounted directly to the refrigeration case.
Figure 10:
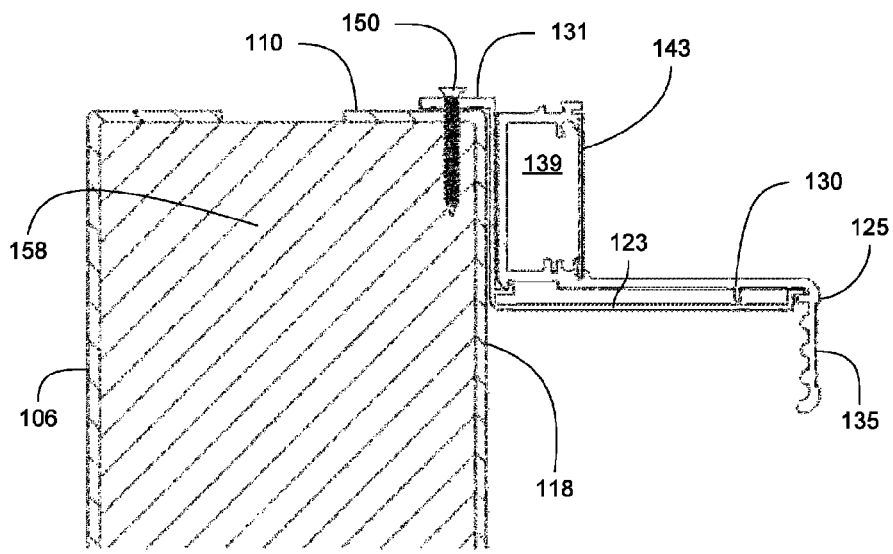
FIG. 10 is a partial cross-sectional view of another embodiment of a lower frame portion that includes an attachment flange coupled to the refrigeration case.

In some embodiments, the frame assembly 128 can be secured directly to the refrigeration case 102, without an adapter. With reference to FIG. 9, the lower frame portion 130 can be secured directly to the bottom external surface 118 of the refrigeration case 102 (using screws 150' or other suitable securing mechanisms) without using a separate adapter piece. For example screws 150' can pass through the side portions 131 and/or 141 of the inner member 125 and/or outer member 123 of the lower frame portion 130. In some embodiments, the outer member 123 can be made of a metal (e.g., steel or aluminum) material or other material that can provide structural strength to facilitate supporting the weight of the frame assembly 128 and doors 126. In some embodiments, the lower frame portion 130 can include reinforcing or strength enhancing features to prevent or reduce bowing of the lower frame portion 130. In some embodiments, the frame assembly 128 can include features similar to the features of the adapter pieces disclosed herein, such that the frame assembly 128 can be secured to the refrigeration case 102 without using a separate adapter piece. For example, with reference to FIG. 10, the lower frame portion 130 can include an attachment flange 131 that extends rearward so that it can be positioned over the bottom surface 110 of the opening 108 and so that screws 150, or other suitable securing mechanisms, can secure the attachment flange 131 to the bottom surface 110 of the opening 108. The attachment flange 131 can be formed as a portion of the outer member 123 (as shown in FIG. 10) or as a portion of the inner member 125.

Figure 11:
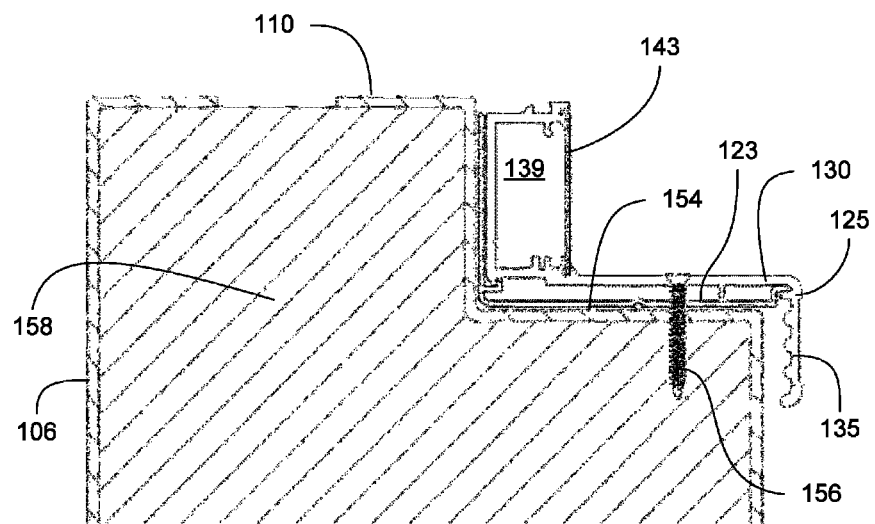
FIG. 11 is a partial cross-sectional view of another embodiment of the lower frame portion mounted in a step formed in the wall of the refrigeration case.

With reference to FIG. 11, in some embodiments, the wall 106 of the refrigeration case 102 can provide support to the frame assembly 128 (e.g., at a location outside the opening 108). The wall 106 can include a support surface 154 for supporting the frame assembly 128. The lower frame portion 130 can rest on the top of the support surface 154 of the wall 106, and the support surface can bear the weight of the frame assembly 128 and doors 126. The lower frame portion 130 can be secured to the wall 106 (e.g., to the support surface 154) by screws 156 or other suitable securing mechanisms (e.g., adhesive, foam tape, bolts, clips, or snap fit mechanisms). In some embodiments, the support surface 154 of the wall 106 can be positioned outside (e.g., forward) of the opening 108. In some embodiments, the support surface 154 of the wall 106 can be positioned lower than the bottom surface 110 of the opening 108. The wall 106 can include a step formed therein, and the step can receive the lower frame portion 130. In some embodiments, the insulation 158 of the wall 106 of the refrigeration case 102 can be disposed rearward of the lower frame portion 130, such that the insulation 158 of the wall 106 insulates the lower frame portion 130 from the cold region inside the interior chamber 104 of the refrigeration unit 100, thereby reducing the amount of power needed to heat the frame assembly 128 to prevent or reduce condensation from forming thereon. In the embodiment shown in FIG. 11, the insulation 158 of the door 106 can be disposed below the lower frame portion 130, which can further insulate the frame assembly 128. In some cases, it can be advantageous to expose the frame assembly 128 to the relatively warm ambient air outside the refrigerated interior chamber 104. Thus, it can be advantageous to omit the insulation 158 located below the lower frame portion 130, such that the lower frame portion can be exposed to the ambient air, as shown, for example, in FIG. 5.

In some embodiments, additional insulation can be used to further insulate the frame assembly 128. For example, additional insulation can be placed over the attachment member 142 of the adapter 140, such that the attachment member 142 of the adapter is sandwiched between the insulated side wall 106 and the additional insulation. With reference to FIGS. 2, 5, and 6, an insulating member 160 can include a cap portion 162 and insulation 164 (e.g., foam insulation). The insulating member 160 (sometimes referred to as an insulating cap) can be disposed over the bottom surface 110 of the opening 108. In some embodiments, the attachment member 142 of the adapter 140 extends only a short distance (e.g., between about 0.5 inches and 1.5 inches, or by about 0.75 inches) into the opening 108 positioned above the bottom surface 110. A filler, such as foam tape 166 (which can provide additional insulation for the adapter 140 and frame assembly 128) can be positioned on the bottom surface 110, rearward of the attachment member 142 of the adapter 140. The insulation 164 of the insulating cap 160 can rest on the filler (e.g., foam tape 166) and the attachment member 142 to insulate the adapter 140 and the frame assembly 128 from the cold region inside the refrigeration case 102. The cap portion 162 can be formed of a rigid material (e.g., a plastic) to protect the insulation 164 and/or to provide a finished appearance. The insulation 164 can be secured to the cap portion 162 by an adhesive or by any other suitable manner, and the insulating cap 160 can be secured above the surface 110 of the wall 106 by the foam tape 166 or by any other suitable manner. In some embodiments, screws 165 can be used to secure the insulating member 160 to the wall 106. As can be seen in FIG. 2, the insulating cap 160 can include cutouts 168 that align with and receive the mullions 136.

The insulating cap 160 can have a width such that the insulating member 160 extends over at least a portion of the lower frame portion 130, as shown, for example, in FIG. 5. The top surface of the lower frame portion 130, which is positioned rearward of the closed door 126, can be covered by the insulation 164 to insulate it from the cold region inside the refrigeration case 102. In some embodiments, the insulating member 160 can attach to the frame assembly 128. For example, the cap portion 162 can include a clip mechanism 169 that can engage a corresponding mechanism 167 (see FIG. 6) on the frame assembly 128, although the insulating member can be attached to the frame assembly 128 in various other manners (e.g., using an adhesive, one or more clips, one or more screws or bolts, etc.). In some embodiments, very little (or none) of the lower frame portion 130 is exposed to the cold area inside the refrigeration case 102. For example, the rearward side of the lower frame portion 130 can be insulated by the wall 106 that is disposed rearward of the lower frame portion 130, and at least a portion of the top of the lower frame portion 130 can be insulated by the insulating member 160 that is disposed above the lower frame portion 130. The closed door 126 and the sealing gaskets 145 and 147 can insulate some of the lower frame portion 130. The bottom surface and/or the front portion of the lower frame portion 130 can be exposed to relatively warm ambient air, not the cold air from inside the refrigeration case 102. Similar configurations are possible for the upper frame portion 132 and the end frame portions 134. In some embodiments, the percentage of the surface area of the lower frame portion 130, the upper frame portion 132, the end frame portions 134, or the full frame assembly 128 that is exposed to the cold air of the inside of the refrigeration case 102 is less than about 50%, less than about 30%, less than about 20%, less than about 10%, less than about 5%, or less than about 2%, or about 0%, and in some cases a small percentage (e.g., about 1%, about 5%, about 10%, or more) of the surface area is exposed to the cold air of the inside of the refrigeration case 102.

Figure 12:
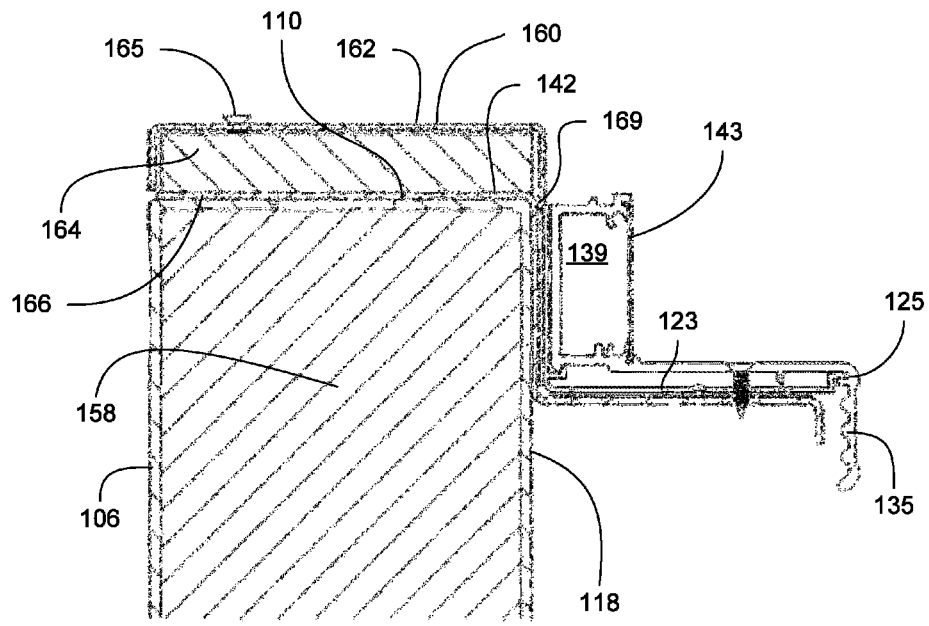
FIG. 12 is a partial-cross sectional view of an embodiment of an insulating end cap that extends over at least a portion of the refrigerator case wall and over at least a portion of the lower frame portion.
Figure 13:
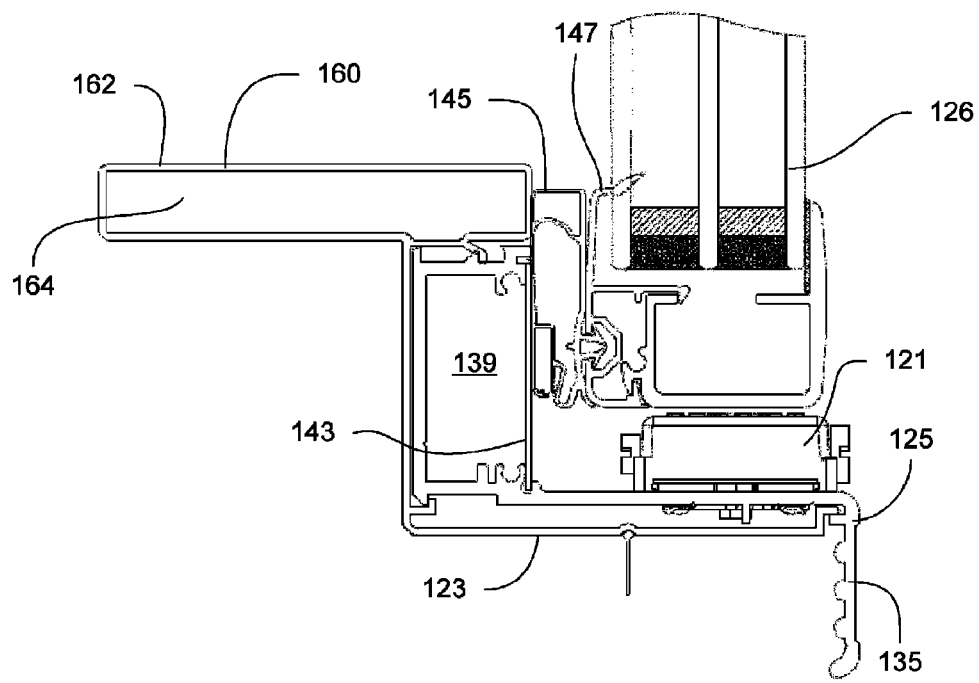
FIG. 13 is a partial cross-sectional view of an embodiment of the lower frame portion and a door in the closed position.

Many variations are possible. For example, with reference to FIG. 12, in some embodiments, the insulating member 160 can cover a portion of the adapter 140 (e.g., the attachment member 142) that would otherwise be exposed to the cold internal air of the refrigeration unit 100. In some embodiments, the insulating member 160 covers the portion of the adapter 140 without covering the portion of the lower frame portion 128 that is exposed to the cold internal air of the refrigeration unit. With reference to FIG. 13, in some embodiments, the insulating member 160 can be incorporated into the frame assembly 128. For example, the insulating member 160 can be attached to, or integrated as an integral portion of, the lower frame portion 130 (e.g., incorporated into the outer member 123).

Figure 12A:
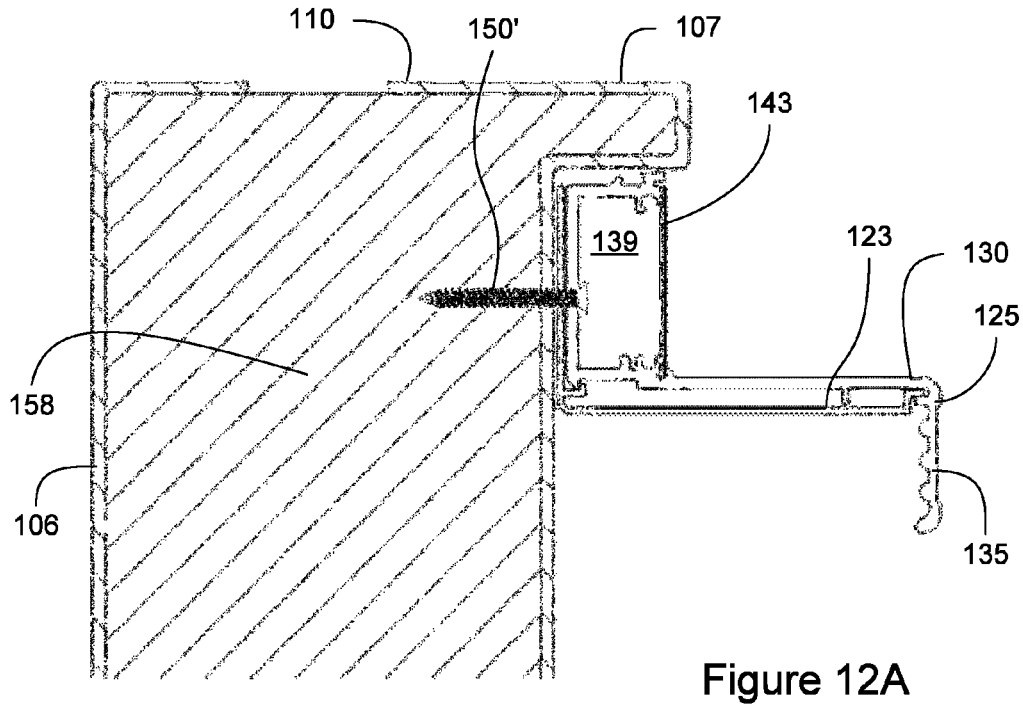
FIG. 12A is a partial cross-sectional view of another embodiment of a refrigeration case with an extension that extends over at least a portion of the lower frame portion.
Figure 12B:
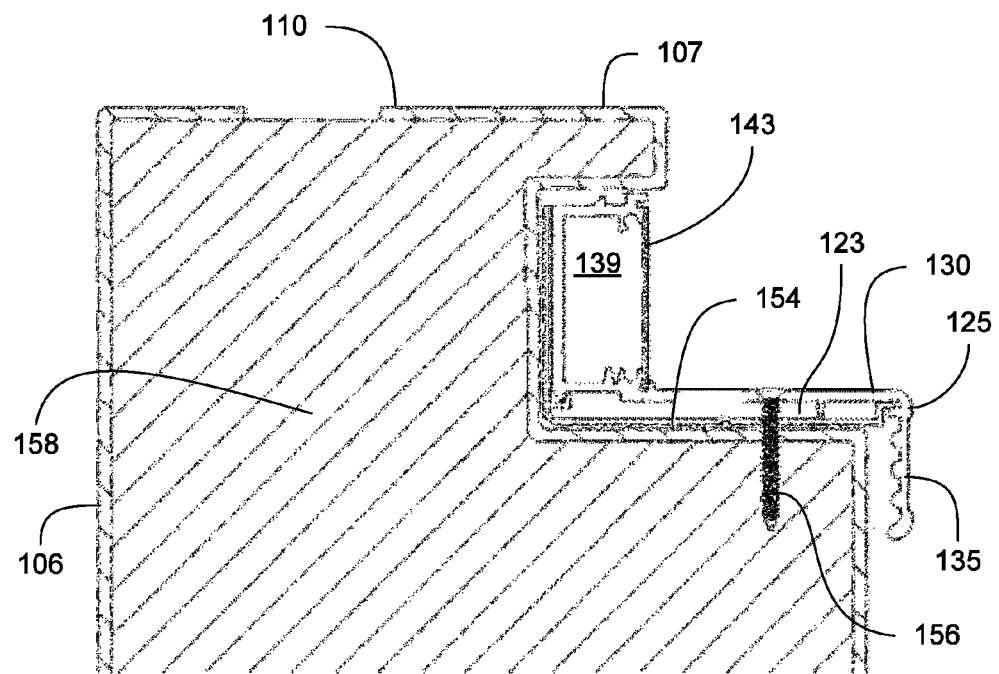
FIG. 12B is a partial cross-sectional view of another embodiment of a refrigeration case with an extension that extends over at least a portion of the lower frame portion.

With reference to FIGS. 12A and 12B, in some embodiments the refrigeration case 102 can insulate at least a portion of the top of the lower frame portion 130 from the cold air in the interior chamber 104 of the refrigeration case 102. For example, the refrigeration case 102 can include an extension portion 107, which can extend forward of the main body of the side wall 106. The extension portion 107 can form an overhang. The frame assembly 128 can be coupled to the refrigeration case 102 such that at least a portion of the lower frame portion 130 is disposed below the extension portion 107. The extension portion 107 can include insulation 158, and can insulate at least a portion of the lower frame portion 130 from the cold interior chamber 104. In some embodiments, the extension portion 107 can extend forward such that at least a majority of the cavity or channel 139 is disposed under the extension portion 107, or such that the entire cavity or channel 139 is disposed under the extension portion 107, or such that the cover 143 is disposed under the extension portion 107. In some embodiments, the extension portion 107 can provide insulation similar to the insulating member 160, only the extension portion 107 can be part of the side wall 106 instead of a supplemental insulating piece that is added to the case 102. The frame assembly 128 can be coupled to the refrigeration case 102 by an adapter (e.g., similar to the adapter 140' of FIG. 7 or FIG. 8) or without an adapter (as shown in FIG. 12A). With reference to FIG. 12B, in some embodiments, the refrigeration case 102 can include a support surface 154 for supporting the frame assembly 128 (e.g., in a manner similar to FIG. 11).

With reference again to FIGS. 2 and 5, additional features can be included. For example, in some instances, when retrofitting an existing refrigeration unit 100 by removing a frame that is mounted inside the opening 108 and adding a frame that is mounted outside the opening, the refrigeration case 102 can be left with a gap or an unfinished surface that had previously been covered or filled by the frame that was inside the opening 108. A cover 170 can be used to cover the gap or unfinished surface. With reference to FIGS. 2 and 5, the refrigeration case 102 can include a member 172 that is spaced apart from the bottom surface 110 of the opening 108, thereby forming a gap or an unfinished surface between the member 172 and the wall 106. The cover 170 can cover the gap or unfinished surface. In some embodiments, the cover 170 can include a covering portion and an attachment portion 176, which can be angled with respect to the covering portion (e.g., forming a generally L-shaped cross-sectional shape). The attachment portion 176 can be secured to the member 172 of the refrigeration case 102 by a screw 174 or other suitable securing mechanism.

Figure 14:
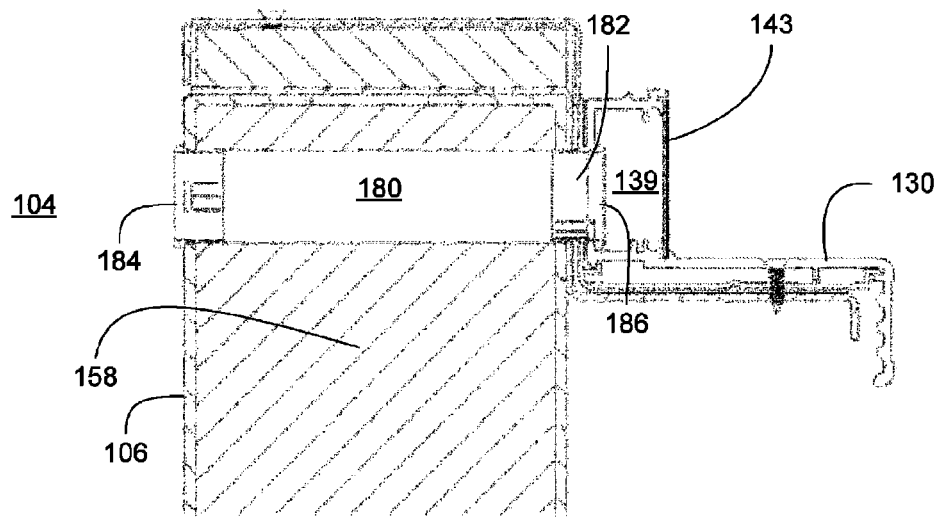
FIG. 14 is a partial cross-sectional view of an embodiment of a case wall having a passage for receiving wires from the frame assembly.

With reference to FIGS. 2 and 14, in some embodiments, the wall 106 can include a hole or passage 180, and electrical cables (not shown in FIGS. 2 and 14) can pass from the interior chamber 104, through the hole 180 in the wall 106, to the frame assembly 128 (e.g., to the channel 139 of the frame assembly 128). In some embodiments, the frame assembly 128 (e.g., the lower portion 130 of the frame assembly 128) can include a hole or opening 182 (e.g., formed in the back wall thereof) to allow the wires to enter the frame assembly 128. The wires can provide power or input signals to the one or more heaters and/or the one or more light sources 138 that can be incorporated into the frame assembly 128. The wires can be attached to a power source associated with the refrigeration unit 100 and/or to a controller for providing input signals to the one or more heaters and/or the one or more light sources 138. A grommet 184 can be positioned at the interior side of the hole 180, and a grommet 186 can be positioned at the exterior side of the hole 180. In some embodiments, the grommet 186 can cover the hole through the frame assembly 128 and the exterior edge of the hole in the wall 106. In some embodiments, the hole 180 can be filled with insulating foam (not shown), which can be inserted into the hole 180 after the wires are in place.

The top frame portion 132 (header portion) can be similar to the lower frame portion 130 (sill portion) described herein, but can be oriented up-side-down from the orientation of the lower frame portion 130. The right and left side portions 134 (end portions) of the frame assembly 128 can be similar to the lower frame portion 130 (sill portion) described herein, but can be oriented perpendicular to the orientation of the lower frame portion 130. The upper frame portion 132 of the frame assembly 128 can be mounted to the refrigeration case 102 in a manner similar to any of those discussed in connection with the lower frame portion 130, but with the orientation changed. The right and left side portions 134 of the frame assembly 128 can be mounted to the refrigeration case 102 in a manner similar to the any of those discussed in connection with the lower frame portion 130, but with the orientation changed. Accordingly, the disclosure associated with FIGS. 2-14 can apply to the upper frame portion 132 and the side frame portions 134 as well as the lower frame portion 130. Various alternative mounting systems, adapters, and methods can be used other than those specifically described and illustrated herein.

Figure 15:
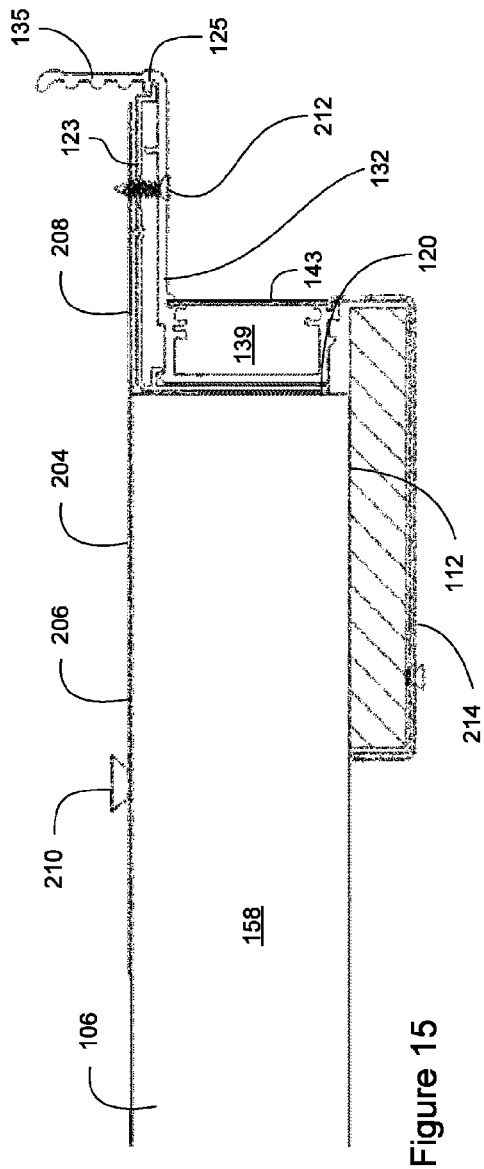
FIG. 15 is a partial cross-sectional view of an embodiment of the upper frame portion attached to the refrigeration case.

In some embodiments, the upper frame portion 132 can be coupled to the refrigeration case 102 in a manner different than the lower frame portion 130. In some embodiments, the upper frame portion 132 bears less of the weight of the doors 126 than the lower frame portion 130, and the upper frame portion 132 can be attached to the refrigeration case 102 in a manner that is designed to bear less weight than for the lower frame portion 130. With reference to FIG. 15, an adapter 204 can be used to mount the upper frame portion 132 (e.g., at a location that is forward of the top exterior surface 120 positioned adjacent to the opening 108). The adapter 204 can be an elongate plate having a rear portion 206 that extends over the top of the wall 106 of the refrigeration case 102, and having a front portion 208 that extends forward past the top exterior surface 120 of the case 102. The rear portion 206 can be secured to the refrigeration case 102 by screws 210 or by other suitable securing mechanisms. The front portion 208 of the adapter 204 can provide a support surface, and the upper frame portion 132 can be secured to the front portion 208 of the adapter 204 using screws 212 or other suitable securing mechanisms. In some embodiments, an insulating cap 214 (which can be similar to the insulating cap 160) can cover a portion of the upper frame portion 132 to insulate the upper frame portion 132 from the cold region inside the refrigeration case 102.

Figure 16:
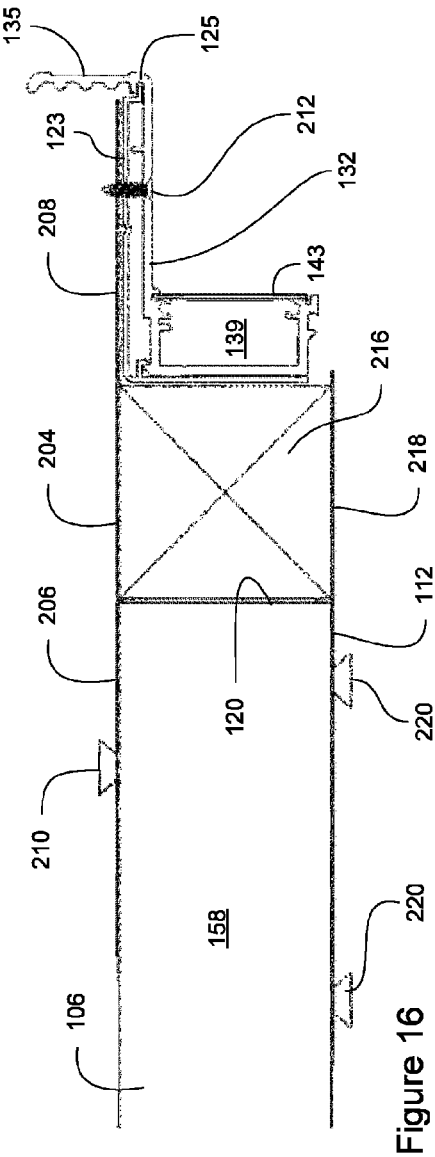
FIG. 16 is a partial cross-sectional view of an embodiment of the upper frame portion attached to the refrigeration case and an extender.
Figure 17:
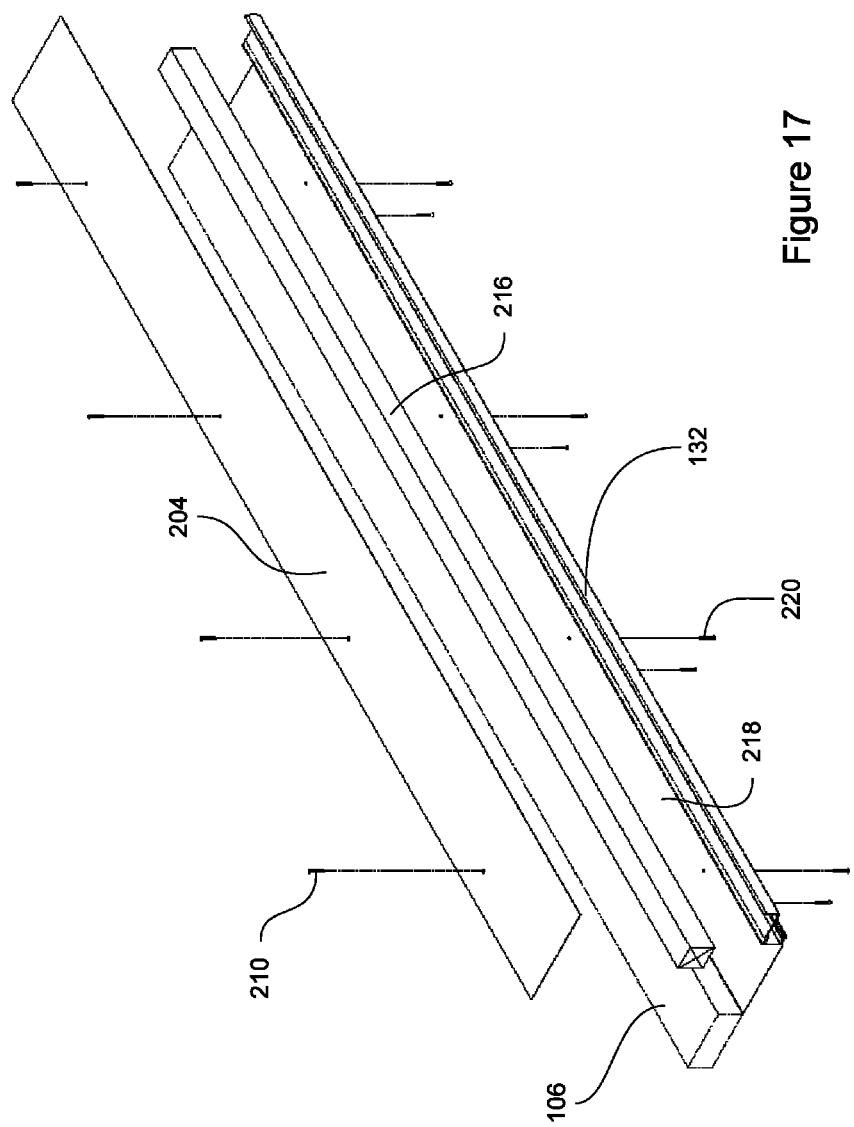
FIG. 17 is a partial perspective view of the upper frame portion attached to the refrigeration case and the extender.

In some embodiments, one or more of the exterior surfaces 118, 120, 122, and 124 can be offset (e.g., further forward or further rearward) than one or more of the other exterior surfaces 118, 120, 122, and 124. In some embodiments, an extension can be applied when mounting the frame assembly 128 forward of the exterior surfaces 118, 120, 122, and 124 in order to compensate for one or more surfaces that are recessed further rearward than the others. With reference to FIGS. 16 and 17, the top exterior surface 120 can be positioned further rearward than bottom external surface 118, and an extender can be applied when mounting the frame assembly 128. For example, an adapter 204 can be applied, similar to FIG. 15. An extender 216 can be positioned between the top exterior surface 120 and the upper frame portion 132. The extender 216 can be sized so that the forward edge of the extender 216 substantially aligns with the bottom exterior surface 118. The extender 216 can be made of an insulating material, such as insulating foam. A lower plate 218 can be secured to the refrigeration case 102 (e.g., to the top surface 112 of the opening) using screws 220 or other suitable securing mechanisms, and the lower plate 218 can extend forward past the top exterior surface 120 such that the lower plate 218 can hold the extender 216 in place.

FIG. 18 is a partial cross-sectional view of the right frame portion 134 attached to the refrigeration case 102. The right frame portion 134 can include a light source 138 attached to the back thereof. In some embodiments, the end frame portions 134 can be positioned forward of the opening 108, but can be positioned generally in front of the opening 108 (as opposed to being positioned generally in front of the side exterior surfaces 122 such that the light source 138 can be positioned at a location that can illuminate the good displayed in the refrigeration case 102. With reference to FIG. 18, an extension adapter 222 can be coupled to the side wall 106 of the refrigeration case 102 and can extend forward past the side exterior surface 122. The extension adapter 222 can be generally U-shaped, having a first side 224 that secures to the outside of the side wall 106 by screws 226 or any other suitable securing mechanism, and a second side 228 that secures to the inside of the side wall 106 by screws 230 or any other suitable securing mechanisms. The right frame portion 134 can be secured to the second side 228 of the extension adapter 222 by screws 232 or by any other suitable securing mechanisms. The area 223 inside the extension adapter 222 can be filed with insulating material (e.g., insulating foam) or can be in communication with the outside ambient air.

With reference to FIG. 19, in some embodiments, the right frame portion 134' can be disposed generally in front of the right external surface 122 adjacent to the opening 108. The right frame portion 134' can be mounted to the wall 106 using an adapter 234, which can function similar to the adapter 204 discussed in connection with FIG. 15. The right frame portion 134' can include an extension 236 that extends over the opening 108 and the light source 138 can be attached to the extension 236 such that the light source 138 is positioned at a location (e.g., inside the opening 108) that allows the light source 138 to illuminate the goods displayed in the refrigeration case 102.

In some embodiments, light sources 138 care not attached to the end frame portions 134. For example, the light sources can be attached to the mullions 136 and/or to the inside of the refrigerator case 102. Without the light sources 138 attached to the end frame portions 134, the end frame portions 134 can be better insulated from the cold area inside the refrigeration case 102, e.g., by using insulating caps similar to the insulating caps 160 and 214 discussed herein. Although only the right frame portions 134 are shown in FIGS. 18 and 19, the left frame portions 134 can be mounted to the case 102 in a similar manner, but with the orientation changed.

In some embodiments, a majority (e.g., at least about 60%, at least about 75%, at least about 90%, or about 100%) of the lower frame portion 130 can be disposed forward of the opening 108 (e.g., forward of the bottom exterior surface 118 of the refrigeration case 102). In some embodiments, a majority (e.g., at least about 60%, at least about 75%, at least about 90%, or about 100%) of the lower frame portion 130 can be disposed lower than the opening 108 (e.g., lower than the bottom surface 110 of the opening 108). In some embodiments, a lower portion of the sealing gasket 200 (which can be attached to the lower frame portion 130) can be disposed lower than the opening (e.g., lower than the bottom surface 110 of the opening 108). In some embodiments, a lower portion of the sealing gasket 200 (which can be attached to the lower frame portion 130) can be disposed forward of the opening 108 (e.g., forward of the bottom exterior surface 118 of the refrigeration case 102). In some embodiments, a majority (e.g., at least about 60%, at least about 75%, at least about 90%, or about 100%) of the back side of the lower frame portion 130 faces towards the bottom exterior surface 118 of the refrigeration case 102. In some embodiments, an insulating wall 106 of the refrigeration case 102 is disposed directly rearward of a majority (e.g., at least about 60%, at least about 75%, at least about 90%, or about 100%) of the lower frame portion 130 such that the insulation 158 of the insulating wall 106 insulates the lower frame portion 130 from the interior camber 104 of the refrigeration case 102. In some embodiments, no insulating wall is positioned below a majority (e.g., at least about 60%, at least about 75%, at least about 90%, or about 100%) of the lower frame portion 130, such that the lower frame portion 130 is exposed to ambient air.

In some embodiments, a majority (e.g., at least about 60%, at least about 75%, at least about 90%, or about 100%) of the upper frame portion 132 can be disposed forward of the opening 108 (e.g., forward of the top exterior surface 120 of the refrigeration case 102). In some embodiments, a majority (e.g., at least about 60%, at least about 75%, at least about 90%, or about 100%) of the upper frame portion 132 can be disposed higher than the opening 108 (e.g., higher than the top surface 112 of the opening 108). In some embodiments, an upper portion of the sealing gasket 200 (which can be attached to the upper frame portion 132) can be disposed higher than the opening (e.g., higher than the top surface 112 of the opening 108). In some embodiments, an upper portion of the sealing gasket 200 (which can be attached to the upper frame portion 132) can be disposed forward of the opening 108 (e.g., forward of the top exterior surface 120 of the refrigeration case 102). In some embodiments, a majority (e.g., at least about 60%, at least about 75%, at least about 90%, or about 100%) of the back side of the upper frame portion 132 faces towards the top exterior surface 120 of the refrigeration case 102. In some embodiments, an insulating wall 106 of the refrigeration case 102 is disposed directly rearward of a majority (e.g., at least about 60%, at least about 75%, at least about 90%, or about 100%) of the upper frame portion 132 such that the insulation 158 of the insulating wall 106 insulates the upper frame portion 132 from the interior camber 104 of the refrigeration case 102. In some embodiments, no insulating wall is positioned above a majority (e.g., at least about 60%, at least about 75%, at least about 90%, or about 100%) of the upper frame portion 132, such that the upper frame portion 132 is exposed to ambient air.

In some embodiments, a majority (e.g., at least about 60%, at least about 75%, at least about 90%, or about 100%) of the right frame portion 134 can be disposed forward of the opening 108 (e.g., forward of the right exterior surface 122 of the refrigeration case 102). In some embodiments, a majority (e.g., at least about 60%, at least about 75%, at least about 90%, or about 100%) of the right frame portion 134 can be disposed to the right of the opening 108 (e.g., to the right of the right surface 114 of the opening 108). In some embodiments, a right portion of the sealing gasket 200 (which can be attached to the right frame portion 134) can be disposed to the right of the opening 108 (e.g., to the right of the right surface 114 of the opening 108). In some embodiments, a right side portion of the sealing gasket 200 (which can be attached to the right frame portion 134) can be disposed forward of the opening 108 (e.g., forward of the right exterior surface 122 of the refrigeration case 102). In some embodiments, a majority (e.g., at least about 60%, at least about 75%, at least about 90%, or about 100%) of the back side of the right frame portion 134 faces towards the right exterior surface 122 of the refrigeration case 102. In some embodiments, an insulating wall 106 of the refrigeration case 102 is disposed directly rearward of a majority (e.g., at least about 60%, at least about 75%, at least about 90%, or about 100%) of the right frame portion 134 such that the insulation 158 of the insulating wall 106 insulates the right frame portion 134 from the interior camber 104 of the refrigeration case 102. In some embodiments, no insulating wall is positioned to the right of a majority (e.g., at least about 60%, at least about 75%, at least about 90%, or about 100%) of the right frame portion 134, such that the right frame portion 134 is exposed to ambient air.

In some embodiments, a majority (e.g., at least about 60%, at least about 75%, at least about 90%, or about 100%) of the left frame portion can be disposed forward of the opening 108 (e.g., forward of the left exterior surface 124 of the refrigeration case 102). In some embodiments, a majority (e.g., at least about 60%, at least about 75%, at least about 90%, or about 100%) of the left frame portion can be disposed to the left of the opening 108 (e.g., to the left of the left surface 116 of the opening 108). In some embodiments, a left portion of the sealing gasket 200 (which can be attached to the left frame portion) can be disposed to the left of the opening 108 (e.g., to the left of the left surface 116 of the opening 108). In some embodiments, a left side portion of the sealing gasket 200 (which can be attached to the left frame portion) can be disposed forward of the opening 108 (e.g., forward of the left exterior surface 124 of the refrigeration case 102). In some embodiments, a majority (e.g., at least about 60%, at least about 75%, at least about 90%, or about 100%) of the back side of the left frame portion faces towards the left exterior surface 124 of the refrigeration case 102. In some embodiments, an insulating wall 106 of the refrigeration case 102 is disposed directly rearward of a majority (e.g., at least about 60%, at least about 75%, at least about 90%, or about 100%) of the left frame portion such that the insulation 158 of the insulating wall 106 insulates the left frame portion from the interior camber 104 of the refrigeration case 102. In some embodiments, no insulating wall is positioned to the left of a majority (e.g., at least about 60%, at least about 75%, at least about 90%, or about 100%) of the left frame portion, such that the left frame portion is exposed to ambient air.

In some embodiments, a majority (e.g., at least about 60%, at least about 75%, at least about 90%, or about 100%) of the frame assembly 128 can be disposed forward of the opening 108 (e.g., forward of the exterior surfaces 118, 120, 122, and 124 of the refrigeration case 102). In some embodiments, the sealing gasket 200 (which can be attached to the frame assembly 128) can be disposed forward of the opening 108 (e.g., forward of the exterior surfaces 118, 120, 122, and 124 of the refrigeration case 102). In some embodiments, at least a portion (e.g., at least about 25%, at least about 40%, at least about 60%, at least about 75%, at least about 90%, or about 100%) of the back side of the frame assembly 128 faces towards the exterior surfaces 118, 120, 122, and 124 of the refrigeration case 102. In some embodiments, an insulating wall 106 of the refrigeration case 102 is disposed directly rearward of at least a portion (e.g., at least about 25%, at least about 40%, at least about 60%, at least about 75%, at least about 90%, or about 100%) of the frame assembly 128 such that the insulation 158 of the insulating wall 106 insulates the frame assembly 128 from the interior camber 104 of the refrigeration case 102. In some embodiments, no insulating wall is positioned to the outside of a majority (e.g., at least about 60%, at least about 75%, at least about 90%, or about 100%) of the frame assembly 128, such that the frame assembly 128 is exposed to ambient air. In some embodiments, the one or more doors 126 are substantially entirely disposed forward of the opening 108 (e.g., forward of the exterior surfaces 118, 120, 122, and 124 of the refrigeration case 102). In some embodiments, the vertical height of the one or more doors 126 can be greater than the vertical height of the opening 108. In some embodiments, the vertical height of the frame assembly 128 can be greater than the vertical height of the opening 108. In some embodiments, the horizontal width of the frame assembly 128 can be greater than the horizontal width of the opening 108.

FIG. 20 is a flow chart of one embodiment of a method 300 for retrofitting a refrigeration unit 100 to include a frame that is mounted outside the opening 108. At block 302 the existing frame (which can be mounted inside the opening 108) is removed from the refrigeration case 102. At block 304, one or more adapter pieces can be attached to the refrigeration case 102. For example, the adapters 140, 140', 204, 216, 218, 222, and 234 can be used for mounting the frame assembly 128, as discussed herein. In some embodiments, an adapter 140 for the lower frame portion 130 can be secured to the refrigeration case 102 by securing mechanisms (e.g., screws) that engage the same area, the same surface, or the same screw holes that were used to secure the original frame (removed at block 302) to the refrigeration case 102. In some embodiments, the step of attaching one or more adapter pieces to the refrigeration case 102 can be excluded. At block 306, the frame assembly 128 is attached to the refrigeration case 102 (e.g., via the one or more adapter pieces). The frame assembly 128 can be mounted outside the opening 108, as discussed herein. At block 308, a hole can be formed in the refrigerator case 102 to allow wires of the frame assembly 128 to pass through the case 102. At block 310, additional insulation (e.g., the insulating caps 160 and/or 214 or the like) can optionally be added to improve insulation of the frame assembly 128. At block 312, gaps or unfinished surfaces can optionally be covered. Many variations are possible. Certain steps can be omitted. For example, in some embodiments, no adapter is used for mounting the frame, no hole is made for the wires, and/or no gaps or unfinished surfaces are covered. Certain steps can be combined or reordered or divided into separate steps. For example, the steps of attaching the one or more adapter pieces and attaching the frame can be performed together.

Certain embodiments of the inventions are described above with reference to the accompanying figures. Although certain embodiments and examples are disclosed herein, the inventive subject matter extends beyond the specifically disclosed embodiments to other alternative embodiments and modifications and equivalents thereof. Thus, the scope of the inventions is not limited by any of the particular embodiments disclosed herein. Although certain advantages and other aspects of the inventions are discussed herein, not necessarily all such aspect or advantages are achieved by any particular embodiment. Thus, for example, various embodiments may be carried out in a manner that achieves or optimizes one advantage or group of advantages a disclosed herein. Various features, aspects, and advantages disclosed herein can be combined to form various combinations and subcombinations (e.g., certain features in some embodiments can be combined with other features in other embodiments and still fall within the scope of the inventions), as will be understood to one of skill in the art in view of the present disclosure.

What is claimed is:
1. A refrigeration unit comprising:
 a refrigeration case comprising an interior chamber, at least one side wall, and an opening to provide access to the interior chamber, wherein the opening comprises a bottom surface at a bottom of the opening, and wherein the refrigeration case comprises a bottom exterior surface adjacent to the bottom of the opening;
 a frame assembly coupled to the refrigeration case, the frame assembly comprising a lower portion;
 at least one door coupled to the frame assembly, wherein the at least one door is movable between an open position and a closed position; and
 a frame sealing gasket, wherein a lower portion of the frame sealing gasket is attached to the lower frame portion, the frame sealing gasket being configured to seal against the at least one door when the at least one door is in the closed position, wherein at least a portion of the lower portion of the frame sealing gasket is disposed lower than the bottom surface of the opening;
 wherein at least a portion of the lower frame portion is disposed outside the opening such that the at least one door is disposed forward of a plane defined by the bottom exterior surface of the refrigeration case.
2. The refrigeration unit of claim 1, further comprising at least one adapter that couples the frame assembly to the refrigeration case.

3. The refrigeration unit of claim 2, wherein the at least one adapter comprises:
an attachment member removably coupled to the bottom surface of the opening;
a substantially horizontal support surface disposed outside the opening, wherein the frame assembly is positioned over the support surface such that the support surface provides support to the frame assembly; and
an extension portion extending substantially downward from the attachment member to the support surface such that the support surface is spaced apart from the attachment member and disposed lower than the bottom surface of the opening.

4. The refrigeration unit of claim 1, wherein a majority of the lower frame portion is disposed forward of the plane defined by the bottom exterior surface of the refrigeration case.

5. The refrigeration unit of claim 1, wherein a majority of the lower frame portion is disposed lower than the bottom surface of the opening.

6. The refrigeration unit of claim 1, further comprising a frame sealing gasket, wherein a lower portion of the frame sealing gasket is attached to the lower frame portion, the frame sealing gasket being configured to seal against the at least one door, wherein the lower portion of the frame sealing gasket is disposed forward of the plane defined by the bottom exterior surface of the refrigeration case.

7. The refrigeration unit of claim 1, wherein the frame assembly includes an upper frame portion, a right frame portion, and a left frame portion, wherein the frame portions are coupled to form a closed rectangular shape.

8. The refrigeration unit of claim 1, wherein the lower frame portion comprises a back side that faces substantially rearward, and wherein a majority of the back side of the lower frame portion faces towards the bottom exterior surface.

9. The refrigeration unit of claim 1, wherein the at least one side wall includes an insulating wall that comprises insulation, wherein the insulating wall is disposed directly rearward of a majority of the lower frame portion such that the insulation of the insulating wall insulates the lower frame portion from the interior chamber of the refrigeration case.

10. The refrigeration unit of claim 9, wherein a majority of the lower frame portion does not have the insulating wall disposed directly therebelow.

11. The refrigeration unit of claim 1, further comprising an insulating member disposed over at least a portion of the lower frame portion.

12. The refrigeration unit of claim 1, wherein less than 20% of the lower frame portion is exposed to the interior chamber of the refrigeration unit.

13. The refrigeration unit of claim 1, wherein the at least one side wall includes an extension portion that is disposed over at least a portion of the lower frame portion, the extension portion comprising insulation.

14. The refrigeration unit of claim 1, wherein the refrigeration case comprises a support surface configured to support the frame assembly.

15. The refrigeration unit of claim 1, wherein the at least one door comprises a transparent panel, and wherein a bottom of the transparent panel is disposed lower than the bottom surface of the opening.

16. The refrigeration unit of claim 1, further comprising a heater configured to heat the frame assembly, wherein the lower frame portion comprises a channel disposed forward of the plane defined by the bottom exterior surface of the refrigerator case, and wherein one or more wires for the heater are routed through the channel.

17. The refrigeration unit of claim 16, wherein the channel is disposed lower than the bottom surface of the opening.

18. The refrigeration unit of claim 16, wherein the at least one side wall comprises a hole, and wherein the one or more wires for the heater are routed through the hole in the at least one side wall.

19. The refrigeration unit of claim 1, wherein the at least one door is coupled to the lower frame portion at a location that is lower than the bottom surface of the opening.

20. A refrigeration unit comprising:
a refrigeration case comprising an interior chamber, at least one side wall, and an opening to provide access to the interior chamber;
a frame assembly coupled to the refrigeration case, the frame assembly configured to attach to at least one door, the frame assembly comprising a lower portion, wherein a majority of the lower frame portion is disposed outside the opening; and
at least one door coupled to the frame assembly, wherein the at least one door is movable between an open position and a closed position, and wherein the at least one door is coupled to the lower portion of the frame assembly at a location that is lower than a bottom of the opening.

21. The refrigeration unit of claim 20, wherein a majority of the frame assembly is disposed outside the opening.

22. The refrigeration unit of claim 20, further comprising a frame sealing gasket attached to the frame assembly and configured to seal against the at least one door, wherein the frame sealing gasket is disposed outside the opening.

23. The refrigeration unit of claim 20, wherein the at least one door is disposed forward of the opening when the door is in the closed position.

24. The refrigeration unit of claim 20, wherein a vertical height of the at least one door is greater than a vertical height of the opening.

25. The refrigeration unit of claim 20, wherein a vertical height of the frame assembly is greater than a vertical height of the opening.

26. The refrigeration unit of claim 20, wherein a horizontal width of the frame assembly is greater than a horizontal width of the opening.

27. A refrigeration unit comprising:
a refrigeration case comprising an interior chamber, at least one side wall, and an opening to provide access to the interior chamber, wherein the opening comprises a bottom surface at a bottom of the opening, and wherein the refrigeration case comprises a bottom exterior surface adjacent to the bottom of the opening;
at least one door comprising a door sealing gasket; and
means for coupling the at least one door to the refrigeration case such that the at least one door is movable between an open position and a closed position, and wherein the at least one door is disposed forward of a plane defined by the bottom exterior surface of the refrigeration case, wherein at least a portion of the door sealing gasket is disposed lower than the bottom surface of the opening.

28. The refrigeration unit of claim 27, wherein the coupling means comprises a frame assembly.

* * * * *